United States Patent
Gao et al.

(10) Patent No.: US 11,158,302 B1
(45) Date of Patent: Oct. 26, 2021

(54) ACCENT DETECTION METHOD AND ACCENT DETECTION DEVICE, AND NON-TRANSITORY STORAGE MEDIUM

(71) Applicant: NEWORIENTAL EDUCATION & TECHNOLOGY GROUP LTD., Beijing (CN)

(72) Inventors: Xinglong Gao, Beijing (CN); Yue Li, Beijing (CN); Wei Qu, Beijing (CN)

(73) Assignee: NEW ORIENTAL EDUCATION & TECHNOLOGY GROUP INC., Beijing (CN)

( * ) Notice: Subject to any disclaimer, the term of this patent is extended or adjusted under 35 U.S.C. 154(b) by 0 days.

(21) Appl. No.: 17/050,034

(22) PCT Filed: Jul. 28, 2020

(86) PCT No.: PCT/CN2020/105161
§ 371 (c)(1),
(2) Date: Oct. 23, 2020

(30) Foreign Application Priority Data

May 11, 2020 (CN) .......................... 202010389701.4

(51) Int. Cl.
| | | |
|---|---|---|
| *G10L 15/00* | (2013.01) | |
| *G10L 15/02* | (2006.01) | |
| *G10L 21/10* | (2013.01) | |
| *G06N 7/00* | (2006.01) | |
| *G10L 25/78* | (2013.01) | |
| *G10L 21/18* | (2013.01) | |

(Continued)

(52) U.S. Cl.
CPC .............. *G10L 15/02* (2013.01); *G06N 7/005* (2013.01); *G10L 21/10* (2013.01); *G10L 21/18* (2013.01); *G10L 25/78* (2013.01); *G10L 13/10* (2013.01); *G10L 19/02* (2013.01)

(58) Field of Classification Search
CPC combination set(s) only.
See application file for complete search history.

(56) References Cited

U.S. PATENT DOCUMENTS

2014/0052446 A1    2/2014 Mori et al.

FOREIGN PATENT DOCUMENTS

| CN | 101751919 A | 6/2010 |
|---|---|---|
| CN | 104575518 A | 4/2015 |

(Continued)

OTHER PUBLICATIONS

China National Intellectual Property Administration, First Office Action, dated Jun. 28, 2020, 5 pages.

(Continued)

*Primary Examiner* — Vu B Hang
(74) *Attorney, Agent, or Firm* — Loeb & Loeb LLP

(57) ABSTRACT

Disclosed are an accent detection method, an accent detection device and a non-transitory storage medium. The accent detection method includes: obtaining audio data of a word; extracting a prosodic feature of the audio data to obtain a prosodic feature vector; generating a spectrogram based on the audio data to obtain a speech spectrum feature matrix; performing a concatenate operation on the prosodic feature vector and the speech spectrum feature matrix to obtain a first feature matrix, and performing a redundancy removal operation on the first feature matrix to obtain a second feature matrix; and classifying the second feature matrix by a classifier to obtain an accent detection result of the audio data.

18 Claims, 5 Drawing Sheets

(51) Int. Cl.
*G10L 19/02* (2013.01)
*G10L 13/10* (2013.01)

(56) References Cited

FOREIGN PATENT DOCUMENTS

CN 104732981 A 6/2015
CN 110534089 A 12/2019

OTHER PUBLICATIONS

China National Intellectual Property Administration, Notice of Grant Patent Right for Invention, dated Jul. 21, 2020, 4 pages.
China National Intellectual Property Administration, Invention Patent, Aug. 18, 2020, 35 pages.
Yuenxue Zhao, A Master Thesis of "Chinese Accent Detection Method Research in Noisy Environment," Harbin Normal University, Jun. 2015, 61 pages.

ACCENT DETECTION METHOD AND ACCENT DETECTION DEVICE, AND NON-TRANSITORY STORAGE MEDIUM

The present application claims priority of the Chinese Patent Application No. 202010389701.4 filed on May 11, 2020, the present disclosure of which is incorporated herein by reference in its entirety as part of the present application.

TECHNICAL FIELD

Embodiments of the present disclosure relate to an accent detection method, an accent detection device, and a non-transitory storage medium.

BACKGROUND

In oral English learning, the accuracy of pronunciation of each syllable will directly affect the standard degree of the speaker's English expression, and mastering the accuracy of English accent (stress) pronunciation is very important. Determining whether the pronunciation of a word is accurate or not depends not only on the pronunciation of the syllable, but also on the position of the accent. The accuracy of the accent position will affect the meaning and the part-of-speech of the word, thus an accent detection should also be used as one of the indicators to evaluate the pronunciation quality of a word. In summary, word accent detection is an indispensable part of oral English evaluation. The feedback of accent detection is helpful to guide English learners to improve their oral skills and help English learners learn correct English pronunciation.

SUMMARY

At least one embodiment of the present disclosure provides an accent detection method, which includes: obtaining audio data of a word; extracting a prosodic feature of the audio data to obtain a prosodic feature vector; generating a spectrogram based on the audio data to obtain a speech spectrum feature matrix; performing a concatenate operation on the prosodic feature vector and the speech spectrum feature matrix to obtain a first feature matrix, and performing a redundancy removal operation on the first feature matrix to obtain a second feature matrix; and classifying the second feature matrix by a classifier to obtain an accent detection result of the audio data.

For example, in the accent detection method according to some embodiments of the present disclosure, the performing the concatenate operation on the prosodic feature vector and the speech spectrum feature matrix to obtain the first feature matrix comprises: performing a mean-variance normalization processing on the prosodic feature vector and the speech spectrum feature matrix, respectively, so as to obtain a mean-variance normalized prosodic feature vector and a mean-variance normalized speech spectrum feature matrix, respectively; and performing the concatenate operation on the mean-variance normalized prosodic feature vector and the mean-variance normalized speech spectrum feature matrix to obtain the first feature matrix.

For example, in the accent detection method according to some embodiments of the present disclosure, the mean-variance normalized speech spectrum feature matrix includes a plurality of frequency feature vectors, and the performing the concatenate operation on the mean-variance normalized prosodic feature vector and the mean-variance normalized speech spectrum feature matrix to obtain the first feature matrix includes: performing a dimension transformation operation on the mean-variance normalized prosodic feature vector to obtain a first feature vector, wherein a dimension of the first feature vector is the same as that of any one frequency feature vector in the mean-variance normalized speech spectrum feature matrix; and concatenating the first feature vector and the mean-variance normalized speech spectrum feature matrix to obtain the first feature matrix, wherein the first feature matrix includes the first feature vector and all of the plurality of frequency feature vectors in the mean-variance normalized speech spectrum feature matrix.

For example, in the accent detection method according to some embodiments of the present disclosure, the performing the redundancy removal operation on the first feature matrix to obtain the second feature matrix includes: obtaining cosine similarities by calculating a cosine similarity between the first feature vector in the first feature matrix and each of the plurality of frequency feature vectors in the first feature matrix; and in response to that any one cosine similarity of the cosine similarities is greater than a first preset value, setting a frequency feature vector, which corresponds to the any one cosine similarity, in the first feature matrix as an all-zero vector or deleting a frequency feature vector, which corresponds to the any one cosine similarity, in the first feature matrix from the first feature matrix, so as to obtain the second feature matrix.

For example, in the accent detection method according to some embodiments of the present disclosure, the performing the concatenate operation on the mean-variance normalized prosodic feature vector and the mean-variance normalized speech spectrum feature matrix to obtain the first feature matrix includes: concatenating the mean-variance normalized prosodic feature vector and each frequency feature vector in the mean-variance normalized speech spectrum feature matrix, so as to obtain the first feature matrix.

For example, in the accent detection method according to some embodiments of the present disclosure, the performing the redundancy removal operation on the first feature matrix to obtain the second feature matrix includes: obtaining a first weight matrix; processing the first feature matrix by using the first weight matrix to obtain a dimension reduction matrix, wherein a dimension of the dimension reduction matrix is less than that of the first feature matrix; performing a dimension transformation operation on the dimension reduction matrix to obtain a first intermediate feature matrix, wherein a dimension of the first intermediate feature matrix is the same as that of the first feature matrix; converting each element in the first intermediate feature matrix into a preset interval, so as to obtain a second intermediate feature matrix; and setting, in response to that any element in the second intermediate feature matrix is less than a second preset value, the any element in the second intermediate feature matrix to zero, so as to obtain the second feature matrix.

For example, the accent detection method according to some embodiments of the present disclosure further includes: pre-training a first weight matrix to be trained to obtain the first weight matrix, wherein the pre-training the first weight matrix to be trained includes: obtaining sample audio data of a sample word; obtaining a first feature matrix corresponding to the sample audio data based on the sample audio data; processing the first feature matrix corresponding to the sample audio data by using a first weight matrix to be trained, so as to obtain a dimension reduction matrix corresponding to the sample audio data; processing the dimension reduction matrix corresponding to the sample audio data by using a second weight matrix to be trained, so as to obtain a third feature matrix corresponding to the sample audio data, wherein a dimension of the third feature matrix corresponding to the sample audio data is the same as that of the first feature matrix corresponding to the sample audio data; calculating a loss value by using a loss function based on the third feature matrix corresponding to the sample audio data and the first feature matrix corresponding to the sample audio data; and tuning, based on the loss value, the second weight matrix to be trained and the first weight matrix to be trained, respectively.

For example, in the accent detection method according to some embodiments of the present disclosure, the extracting the prosodic feature of the audio data to obtain the prosodic feature vector includes: determining a Gaussian mixed model of word duration corresponding to the word; and extracting a word duration likelihood corresponding to the audio data based on the Gaussian mixed model of word duration corresponding to the word, wherein an element of the prosodic feature vector includes the word duration likelihood corresponding to the audio data.

For example, in the accent detection method according to some embodiments of the present disclosure, establishing the Gaussian mixed model of word duration includes: obtaining sample audio data of a sample word; obtaining a word duration corresponding to the sample audio data based on the sample audio data; calculating a phoneme weighted sum of the sample word, and determining a category of the sample word based on the phoneme weighted sum of the sample word; and establishing a Gaussian mixed model of word duration corresponding to each category, based on the word duration corresponding to the sample audio data of each sample word in each category.

For example, in the accent detection method according to some embodiments of the present disclosure, the determining the Gaussian mixed model of word duration corresponding to the word includes: obtaining a word duration corresponding to the audio data based on the audio data; calculating a phoneme weighted sum of the word, and determining a category of the word based on the phoneme weighted sum of the word; and determining the Gaussian mixed model of word duration corresponding to the word based on the category of the word; and the extracting the word duration likelihood corresponding to the audio data based on the Gaussian mixed model of word duration corresponding to the word includes: calculating a first probability density value corresponding to the audio data through the Gaussian mixed model of word duration corresponding to the word based on the word duration corresponding to the audio data; and obtaining the word duration likelihood corresponding to the audio data based on the first probability density value corresponding to the audio data.

For example, in the accent detection method according to some embodiments of the present disclosure, the extracting the prosodic feature of the audio data to obtain the prosodic feature vector includes: determining a Gamma mixed model of accent duration corresponding to the word; and extracting an accented syllable duration likelihood corresponding to the audio data based on the Gamma mixed model of accent duration corresponding to the word, wherein an element of the prosodic feature vector includes the accented syllable duration likelihood corresponding to the audio data.

For example, in the accent detection method according to some embodiments of the present disclosure, establishing the Gamma mixed model of accent duration includes: obtaining sample audio data of a sample word; obtaining a word duration corresponding to the sample audio data and a phoneme duration of each phoneme in the sample word based on the sample audio data, and determining a normalized phoneme duration of the each phoneme based on the word duration corresponding to the sample audio data and the phoneme duration of the each phoneme in the sample word that have been obtained; clustering all normalized phoneme durations to obtain at least one phoneme group; taking the at least one phoneme group as a problem set, and performing a decision tree clustering on each phoneme, so as to obtain a clustering state corresponding to each phoneme; and establishing a Gamma mixed model of accent duration corresponding to each phoneme based on the clustering state corresponding to each phoneme.

For example, in the accent detection method according to some embodiments of the present disclosure, the determining the Gamma mixed model of accent duration corresponding to the word includes: obtaining a word duration corresponding to the audio data and a phoneme duration of a vowel phoneme in an accented syllable of the word based on the audio data, and determining a normalized phoneme duration of the vowel phoneme in the accented syllable of the word based on the word duration corresponding to the audio data and the phoneme duration of the vowel phoneme in the accented syllable of the word that have been obtained; and determining the Gamma mixed model of accent duration corresponding to the word based on the vowel phoneme in the accented syllable of the word; and the extracting the accented syllable duration likelihood corresponding to the audio data based on the Gamma mixed model of accent duration corresponding to the word includes: calculating a second probability density value corresponding to the audio data through the Gamma mixed model of accent duration based on the normalized phoneme duration; and obtaining the accented syllable duration likelihood corresponding to the audio data based on the second probability density value corresponding to the audio data.

For example, in the accent detection method according to some embodiments of the present disclosure, the extracting the prosodic feature of the audio data to obtain the prosodic feature vector includes: extracting a word duration likelihood corresponding to the audio data based on a Gaussian mixed model of word duration corresponding to the word; extracting an accented syllable duration likelihood corresponding to the audio data based on a Gamma mixed model of accent duration corresponding to the word; and obtaining a ratio of the accented syllable duration likelihood to the word duration likelihood corresponding to the audio data based on the word duration likelihood corresponding to the audio data and the accented syllable duration likelihood corresponding to the audio data, wherein an element of the prosodic feature vector includes the ratio of the accented syllable duration likelihood to the word duration likelihood corresponding to the audio data.

For example, in the accent detection method according to some embodiments of the present disclosure, the extracting the prosodic feature of the audio data to obtain the prosodic feature vector includes: extracting a slope of word fundamental frequency corresponding to the audio data; wherein an element of the prosodic feature vector includes the slope of word fundamental frequency corresponding to the audio data.

For example, in the accent detection method according to some embodiments of the present disclosure, the extracting the prosodic feature of the audio data to obtain the prosodic feature vector includes: determining an audio segment corresponding to an accented syllable in the word based on the audio data; and sequentially performing a framing operation, a frequency domain transformation operation and a Bark domain transformation operation on the audio segment corresponding to the accented syllable in the word, and extracting a short-term energy variance of accented syllable corresponding to the audio data within a predetermined Bark domain frequency band, wherein an element of the prosodic feature vector includes the short-term energy variance of accent syllable corresponding to the audio data.

For example, in the accent detection method according to some embodiments of the present disclosure, the extracting the prosodic feature of the audio data to obtain the prosodic feature vector includes: performing a syllable segmentation on the audio data according to an accented vowel and an unaccented vowel of the word, so as to obtain an accented audio group including an accented audio segment and an unaccented audio group including an unaccented audio segment; calculating an average fundamental frequency value of the accented audio group and an average fundamental frequency value of the unaccented audio group; and obtaining an average fundamental frequency ratio of the accented audio group to the unaccented audio group corresponding to the audio data based on the average fundamental frequency value of the accented audio group and the average fundamental frequency value of the unaccented audio group, wherein an element of the prosodic feature vector includes the average fundamental frequency ratio of the accented audio group to the unaccented audio group corresponding to the audio data.

For example, in the accent detection method according to some embodiments of the present disclosure, the extracting the prosodic feature of the audio data to obtain the prosodic feature vector includes: performing a syllable segmentation on the audio data according to an accented vowel and an unaccented vowel of the word, so as to obtain an accented audio group including an accented audio segment and an unaccented audio group including an unaccented audio segment; calculating an average energy value of the accented audio group and an average energy value of the unaccented audio group; and obtaining an average energy ratio of the accented audio group to the unaccented audio group corresponding to the audio data based on the average energy value of the accented audio group and the average energy value of the unaccented audio group, wherein an element of the prosodic feature vector includes the average energy ratio of the accented audio group to the unaccented audio group corresponding to the audio data.

For example, in the accent detection method according to some embodiments of the present disclosure, the extracting the prosodic feature of the audio data to obtain the prosodic feature vector includes: determining an audio segment corresponding to an accented syllable in the word based on the audio data; sequentially performing a framing operation, a frequency domain transformation operation and a Bark domain transformation operation on the audio segment corresponding to the accented syllable in the word, and performing a time domain transformation operation on signals within a predetermined frequency band of Bark domain to obtain an intermediate waveform; and performing empirical mode decomposition on the intermediate waveform to obtain at least one mode component corresponding to the audio data, wherein an element of the prosodic feature vector includes the at least one mode component corresponding to the audio data.

For example, in the accent detection method according to some embodiments of the present disclosure, the extracting the prosodic feature of the audio data to obtain the prosodic feature vector includes: extracting at least one selected from a group consisting of a word duration, a word energy, and a word fundamental frequency that correspond to the audio data, wherein an element of the prosodic feature vector includes the at least one selected from the group consisting of the word duration, the word energy, and the word fundamental frequency.

For example, in the accent detection method according to some embodiments of the present disclosure, the generating the spectrogram based on the audio data to obtain the speech spectrum feature matrix includes: determining a pronunciation segment in the audio data corresponding to the word based on the word and the audio data; sequentially performing a framing operation, a frequency domain transformation operation and a Bark domain transformation operation on the pronunciation segment in the audio data to obtain the spectrogram; extracting an original speech spectrum feature matrix within a predetermined Bark domain frequency band based on the spectrogram; and performing a dimension transformation operation on the original speech spectrum feature matrix to obtain the speech spectrum feature matrix.

For example, in the accent detection method according to some embodiments of the present disclosure, the classifier includes a convolutional neural network.

At least one embodiment of the present disclosure further provides an accent detection device, which includes: an obtaining unit, configured to obtain audio data of a word; a prosodic feature extraction unit, configured to extract a prosodic feature of the audio data to obtain a prosodic feature vector; a spectrogram matrix extraction unit, configured to generate a spectrogram based on the audio data to obtain a speech spectrum feature matrix; a matrix computing unit, configured to perform a concatenate operation on the prosodic feature vector and the speech spectrum feature matrix to obtain a first feature matrix, and configured to perform a redundancy removal operation on the first feature matrix to obtain a second feature matrix; and a classification unit, configured to classify the second feature matrix to obtain an accent detection result of the audio data.

At least one embodiment of the present disclosure further provides an accent detection device, which includes: a memory, configured to non-transitorily store computer readable instructions; and a processor, configured to execute the computer readable instructions, wherein upon the computer readable instructions being executed by the processor, the accent detection method according to any one of the embodiments of the present disclosure is executed.

At least one embodiment of the present disclosure further provides a non-transitory storage medium, storing computer readable instructions non-transitorily, wherein upon the computer readable instructions being executed by a computer, instructions for the accent detection method according to any one of the embodiments of the present disclosure are executed.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1:
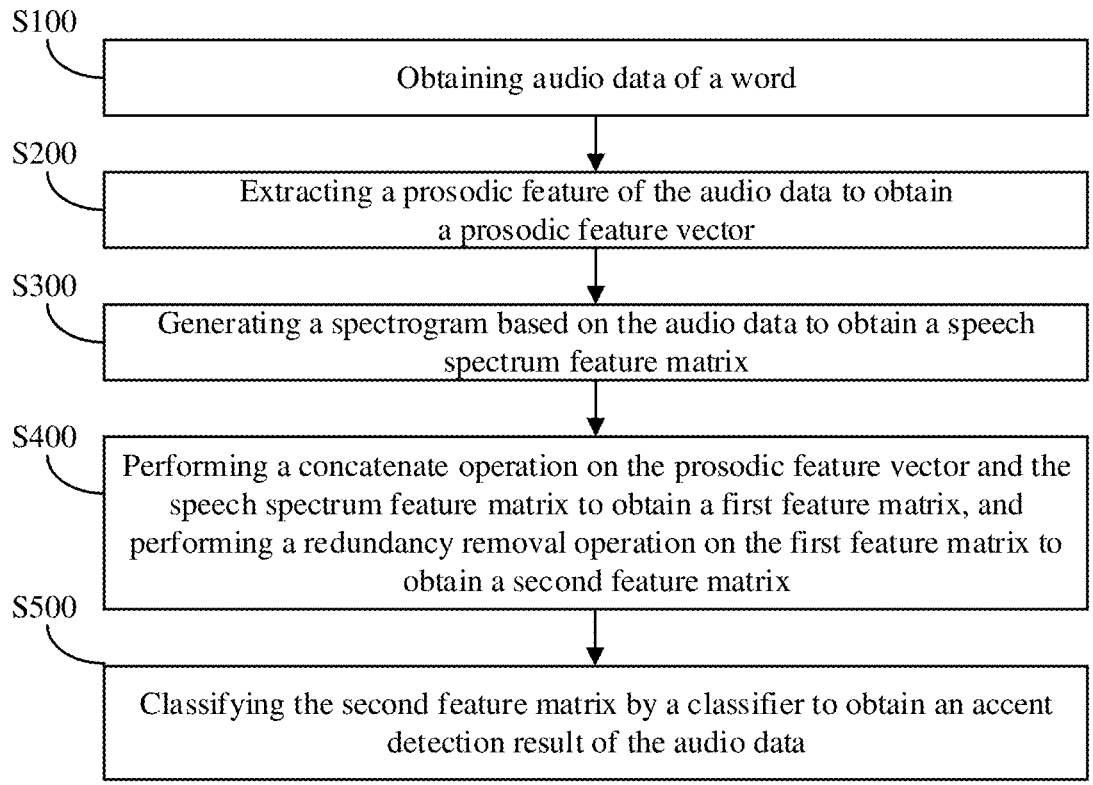
FIG. 1 is a flowchart of an accent detection method provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The present disclosure will be explained by several specific embodiments. In order to keep the following description of the embodiments of the present disclosure clear and concise, detailed descriptions of known functions and known components are omitted in the present disclosure. When any component of the embodiments of the present disclosure appears in more than one drawing, the component is denoted by the same or similar reference numerals in each drawing.

At present, an accent detection method of English pronunciation includes: firstly, extracting prosodic feature parameters from a learner's speech data in units of syllable, and then classifying and detecting the learner' speech data by a classifier according to the prosodic feature parameters to obtain a related accent detection result, so as to determine whether the learners' accent pronunciation is accurate or not. The prosodic feature usually includes a duration of accented syllable, an energy of accented syllable, a fundamental frequency of accented syllable, Mel-frequency cepstral coefficients (MFCC), first-order MFCC, and second-order MFCC, etc. However, on the one hand, the features such as the duration, energy and fundamental frequency of accented syllable mainly focus on the accented syllable segment, while the features of the whole word segment will change in the case where the word is accented in reality. And the calculation of these features lacks integrity, therefore, the distinguishability is greatly affected, and the detection effect is significantly reduced under the condition of large reverberation and background noise. On the other hand, the calculation of nonlinear speech features such as MFCC, first-order MFCC and second-order MFCC, is relatively complicated, and their correlation with syllable accent is not strong, thus having limited improvement on the classification detection result.

At least one embodiment of the present disclosure provides an accent detection method. The accent detection method includes: obtaining audio data of a word; extracting a prosodic feature of the audio data to obtain a prosodic feature vector; generating a spectrogram based on the audio data to obtain a speech spectrum feature matrix; performing a concatenate operation on the prosodic feature vector and the speech spectrum feature matrix to obtain a first feature matrix, and performing a redundancy removal operation on the first feature matrix to obtain a second feature matrix; and classifying the second feature matrix by a classifier to obtain an accent detection result of the audio data.

Some embodiments of the present disclosure further provide an accent detection device and a non-transitory storage medium that correspond to the accent detection method described above.

According to the accent detection method provided by the embodiments of the present disclosure, accent detection is performed by combining prosodic feature and speech spectrum feature, so that the accuracy of the accent detection result can be improved. Meanwhile, the redundancy removal operation can improve the speed and efficiency of accent detection method.

It should be noted that in the embodiments of the present disclosure, "pronunciation segment" refers to a speech segment corresponding to a word in audio data, and "audio segment" refers to a speech segment corresponding to a syllable or a speech segment corresponding to a phoneme.

Some embodiments of the present disclosure and examples thereof will be described in detail with reference to the accompanying drawings. It should be understood that the specific embodiments described herein are only used to illustrate and explain the present disclosure, and are not used to limit the present disclosure.

FIG. 1 is a flowchart of an accent detection method provided by at least one embodiment of the present disclosure. For instance, as illustrated in FIG. 1, the accent detection includes steps S100 to S500.

Step S100: obtaining audio data of a word.

For instance, in step S100, the audio data can include the speech acquired by an audio acquisition device of a client terminal, and can also include the speech synthesized by mechanical or electronic methods, without being limited in the embodiments of the present disclosure. For instance, the client terminal include but is not limited to a smart phone, a tablet computer, a personal computer, a personal digital assistant (PDA), a wearable device, a head-mounted display device, etc. For instance, the audio acquisition device includes but is not limited to a built-in or external microphone of the client terminal. For instance, the audio data can be pre-recorded or recorded in real time, without being limited in the embodiments of the present disclosure.

For instance, in some embodiments, the correct pronunciation of the word is known, that is, the types and numbers of vowel phonemes and consonant phonemes included in the word, and the stress position of the word, etc., are known.

For instance, the word can be a word of a foreign language, such as an English word. However, the present disclosure is not limited thereto, and the word can also be a Chinese word.

Step S200: extracting a prosodic feature of the audio data to obtain a prosodic feature vector.

For instance, in step S200, one or more prosodic features of the audio data obtained in step S100 can be extracted, and a prosodic feature vector (e.g., including a one-dimensional vector or a multi-dimensional vector) can be formed based on the one or more prosodic features. For instance, the prosodic feature vector can be expressed as a column vector, and the embodiments of the present disclosure include but are not limited thereto.

For instance, in some embodiments, the prosodic feature includes a word duration likelihood, that is, an element of the prosodic feature vector includes a word duration likelihood corresponding to the audio data. The extracting the prosodic feature of the audio data can include: determining a Gaussian mixed model of word duration corresponding to the word; and extracting a word duration likelihood corresponding to the audio data based on the Gaussian mixed model (GMM) of word duration corresponding to the word.

Figure 2:
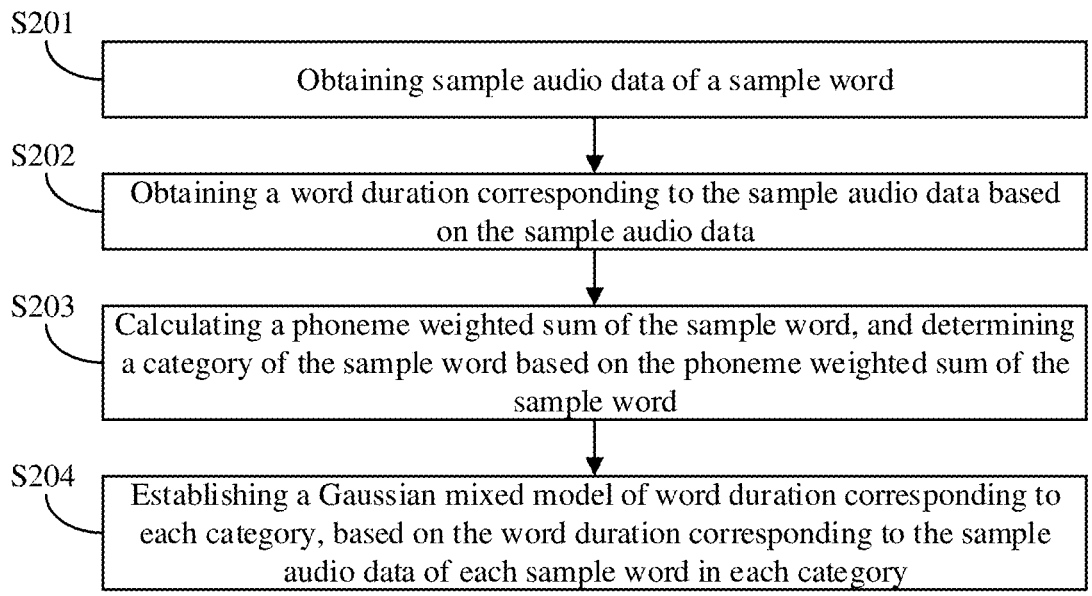
FIG. 2 is a flowchart of pre-establishing a Gaussian mixed model of word duration provided by at least one embodiment of the present disclosure.

For instance, the Gaussian mixed model of word duration can be pre-established. FIG. 2 is a flowchart of establishing a Gaussian mixed model of word duration provided by at least one embodiment of the present disclosure. For instance, in some embodiments, as illustrated in FIG. 2, the establishing the Gaussian mixed model of word duration mentioned above can include steps S201 to S204.

Step S201: obtaining sample audio data of a sample word.

For instance, in step S201, the way of obtaining the sample audio data can be similar to the way of obtaining the audio data in the aforementioned step S100, which will not be described in detail here.

For instance, similar to the word in the aforementioned step S100, the correct pronunciation of the sample word is known, that is, the types and numbers of vowel phonemes and consonant phonemes included in the sample word, and the stress position of the word, etc. are known.

It should be understood that the sample word can be used not only for the pre-establishment of the above-mentioned Gaussian mixed model of word duration, but also for the pre-establishment of the Gamma mixed model of accent duration and the pre-training of the first weight matrix in the following, which is not limited in the embodiments of the present disclosure. It should also be understood that, in the embodiments of the present disclosure, a plurality of sample words can usually be included to realize corresponding mathematical modeling processes (e.g., pre-establishment of Gaussian mixed model and pre-establishment of Gamma mixed model of accent duration) and/or training processes (e.g., pre-training of the first weight matrix).

Step S202: obtaining a word duration corresponding to the sample audio data based on the sample audio data.

For instance, in step S202, a forced alignment operation can be performed on the sample audio data and the sample word by using a predetermined acoustic model, so as to determine the pronunciation segment in the sample audio data corresponding to the sample word, and to take a time length of the pronunciation segment as the word duration corresponding to the sample audio data.

For instance, in general, the acoustic model is obtained by training a large number of English speakers' recordings. Using the acoustic model, the possibility that an input speech corresponds to a known text can be calculated, and then the input speech can be forced to align with the known text. Here, the "input voice" can be the above-mentioned audio data or the above-mentioned sample audio data, and the "known text" may be the above-mentioned word or the above-mentioned sample word. For instance, the related technology of acoustic model and the related technology of forced alignment can be referred to the related technologies in the field of speech recognition, and details will not be repeated here.

It should also be noted that by forced alignment between the input speech and the known text using a predetermined acoustic model, it is also allowed to determine the correspondence between each syllable (e.g., an accented syllable and a non-accented syllable) in the known text and a part of the input speech (e.g., a certain speech segment), as well as the correspondence between each phoneme (e.g., a vowel phoneme and a consonant phoneme) of each syllable in the known text and a part of the input speech (e.g., a certain speech segment).

Step S203: calculating a phoneme weighted sum of the sample word, and determining a category of the sample word based on the phoneme weighted sum of the sample word.

For instance, in step S203, a weight of a vowel phoneme can be set as a, and a weight of a consonant phoneme can be set as 1-a, so that the phoneme weighted sum of the sample word can be calculated according to the following formula (1):

$$W\text{sum} = \text{Ceil}(a*N1 + (1-a)*N2) \quad (1),$$

where Wsum represents a phoneme weighted sum of a sample word, N1 represents the number of vowel phonemes in the sample word, N2 represents the number of consonant phonemes in the sample word, and Ceil(·) represents a ceiling function.

For instance, the value range of the weight a of the vowel phoneme can be set as needed. For instance, in some embodiments, the value range of the weight a of the vowel phoneme can be set to [0.6, 0.8], and the embodiments of the present disclosure include but are not limited thereto.

For instance, in step S203, a plurality of sample words can be divided into one or more categories according to the value of phoneme weighted sum of each of the plurality of sample words. For instance, assuming that a set of phoneme weighted sums of the sample words is {Wsum_1, Wsum_2 ..., Wsum_M}, the plurality of sample words can be divided into m categories, where 1≤m≤M. It should be understood that in the case where m<M, a certain category can usually correspond to the value of one or more phoneme weighted sums. For instance, in some examples, it is assumed that m=M−2, and in this case, Wsum_1 and Wsum_2 may correspond to the same category C1, Wsum_3 to Wsum_(M−2) may each correspond to one category (C2 to C(M−3)), and Wsum_(M−1) and Wsum_M may correspond to the same category C(M−2). It should be noted that, the above division of categories is illustrative, and the embodiments of the present disclosure are not limited thereto. For instance, in some embodiments, the value range of m may be set to [1, 8], and the embodiments of the present disclosure include but are not limited thereto.

Step S204: establishing a Gaussian mixed model of word duration corresponding to each category, based on the word duration corresponding to the sample audio data of each sample word in each category.

For instance, in some embodiments, the expectation maximization (EM) algorithm or any other commonly used algorithm can be adopted to obtain the Gaussian mixed model of word duration corresponding to each category (that is, to solve or estimate the parameters of the model). For instance, the Gaussian mixed model of word duration corresponding to a certain category can be expressed as:

$$p(x) = \sum_{c=1}^{C} w_c N(x \mid (u_c, \epsilon_c)), \quad (2)$$

where p(x) represents a probability density function of a Gaussian mixed model of word duration, $N(x|(u_c, \epsilon_c))$ represents a single Gaussian distribution model with the mean of $u_c$ and the variance of $\epsilon_c$, and $w_c$ is the weight coefficient of $N(x|(u_c, \epsilon_c))$, $w_c>0$, $$\sum_{c=1}^{C} w_c = 1,$$

and C represents the number of single Gaussian distribution models.

Figure 3:
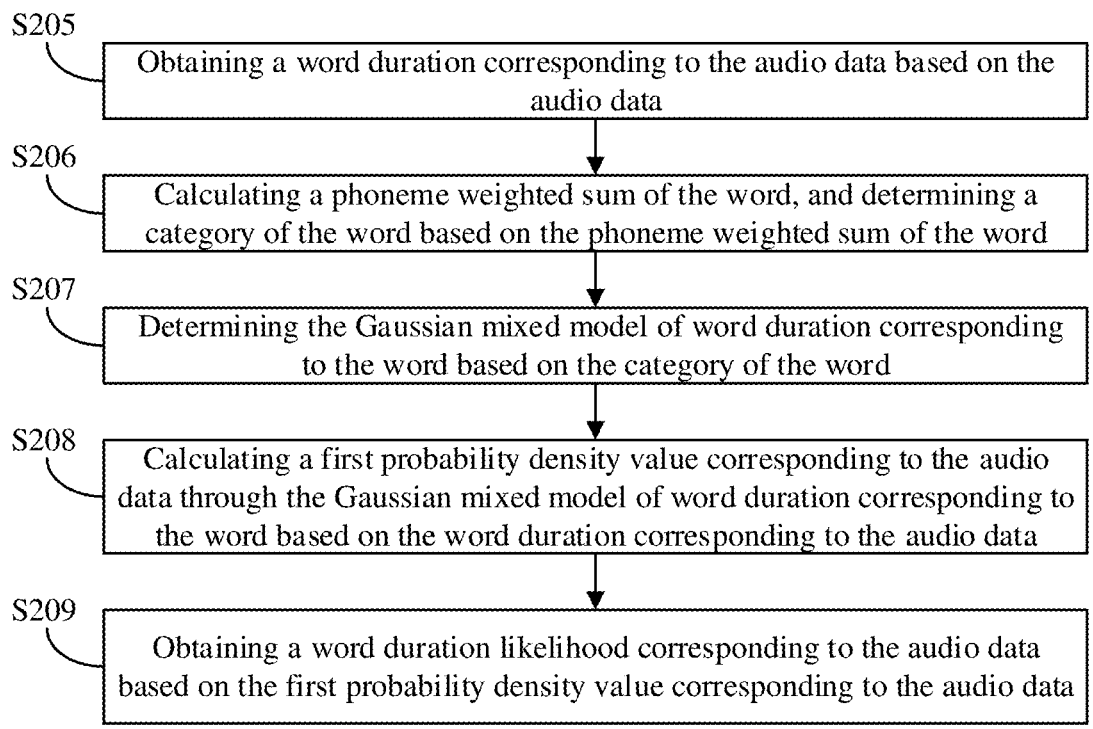
FIG. 3 is a flowchart of extracting a word duration likelihood corresponding to audio data provided by at least one embodiment of the present disclosure.

FIG. 3 is a flowchart of extracting a word duration likelihood corresponding to audio data provided by at least one embodiment of the present disclosure. For instance, in some embodiments, as illustrated in FIG. 3, the determining the Gaussian mixed model of word duration corresponding to the word can include steps S205 to S207.

Step S205: obtaining a word duration corresponding to the audio data based on the audio data.

For instance, in step S205, the audio data can be forced to align with the word by using the predetermined acoustic model, so as to determine the pronunciation segment in the audio data corresponding to the word, and a time length of the pronunciation segment is taken as the word duration corresponding to the audio data.

Step S206: calculating a phoneme weighted sum of the word, and determining a category of the word based on the phoneme weighted sum of the word.

Step S207: determining the Gaussian mixed model of word duration corresponding to the word based on the category of the word.

For instance, a specific implementation manner and process of step S206 can be referred to the related description of the aforementioned step S203. For instance, the phoneme weighted sum of the word can be calculated according to the aforementioned formula (1), so that the category of the word can be determined based on the phoneme weighted sum of the word.

For instance, as illustrated in FIG. 3, the extracting the word duration likelihood corresponding to the audio data based on the Gaussian mixed model of word duration corresponding to the word can include steps S208 to S209.

Step S208: calculating a first probability density value corresponding to the audio data through the Gaussian mixed model of word duration corresponding to the word based on the word duration corresponding to the audio data.

For instance, in step S208, the word duration (obtained from step S205) corresponding to the audio data can be substituted into the Gaussian mixed model of word duration corresponding to the word category (obtained from step S206), so as to obtain the first probability density value corresponding to the audio data, that is, p(x) represents the first probability density value corresponding to the audio data.

Step S209: obtaining a word duration likelihood corresponding to the audio data based on the first probability density value corresponding to the audio data.

For instance, in step S209, the word duration likelihood corresponding to the audio data can be calculated according to the following formula (3):

$$F1 = \arctan(\log(p(x))) \quad (3),$$

where F1 represents the word duration likelihood, log(·) represents a logarithm function with a base of 10, and arctan(·) represents an arctangent function.

For instance, in some embodiments, the word duration likelihood F1 can be directly taken as an element of the prosodic feature vector. For instance, in some other embodiments, the word duration likelihood F1 can be taken as an element of the prosodic feature vector after being normalized with mean-variance.

For instance, in some embodiments, the prosodic feature further includes an accented syllable duration likelihood, that is, an element of the prosodic feature vector further includes an accented syllable duration likelihood corresponding to the audio data. The extracting the prosodic feature of the audio data can include: determining a Gamma mixed model of accent duration corresponding to the word; and extracting an accented syllable duration likelihood corresponding to the audio data based on the Gamma mixed model of accent duration.

Figure 4:
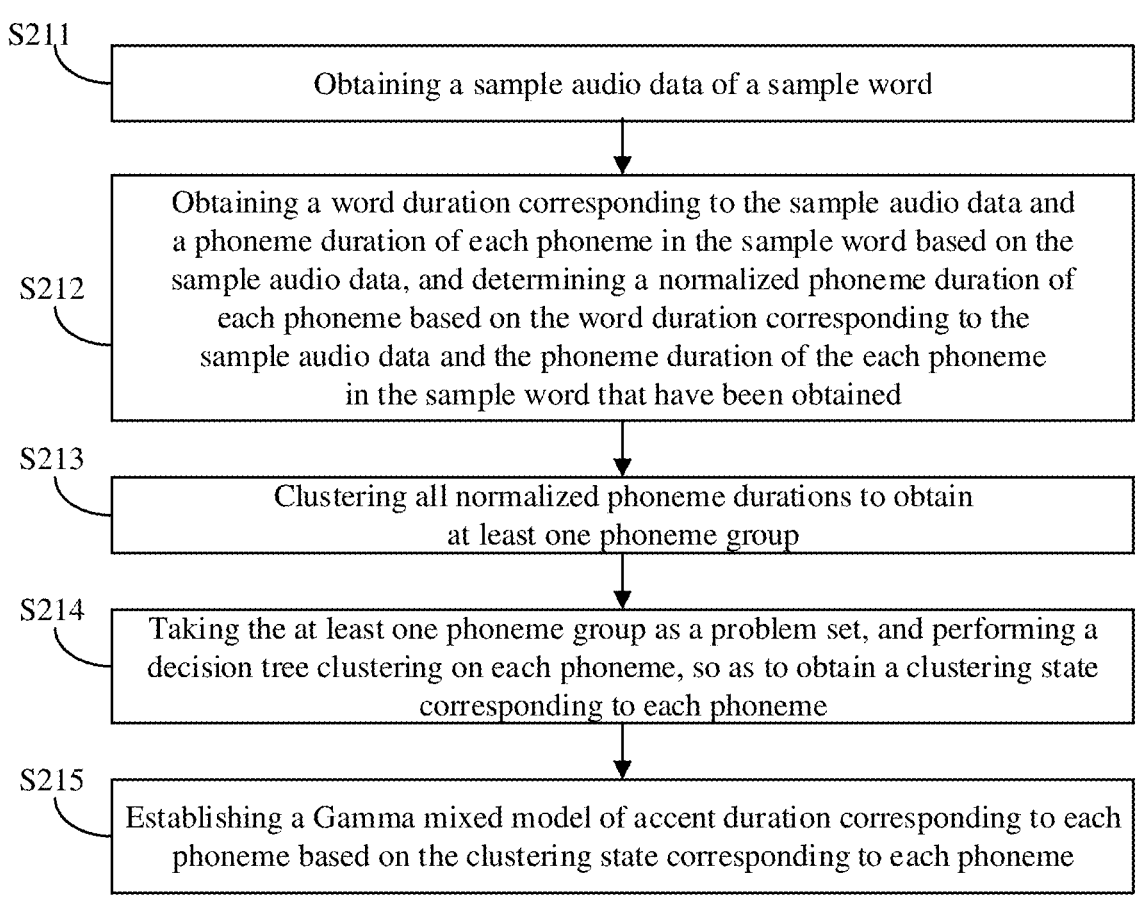
FIG. 4 is a flowchart of pre-establishing a Gamma mixed model of accent duration provided by at least one embodiment of the present disclosure.

FIG. 4 is a flowchart of pre-establishing a Gamma mixed model of accent duration provided by at least one embodiment of the present disclosure. For instance, in some embodiments, as illustrated in FIG. 4, the pre-establishing the Gamma mixed model of accent duration can include steps S211 to S215.

Step S211: obtaining sample audio data of a sample word.

For instance, the specific implementation manner and process of step S211 can be referred to the related description of the aforementioned step S201, and details will not be repeated here.

Step S212: obtaining a word duration corresponding to the sample audio data and a phoneme duration of each phoneme in the sample word based on the sample audio data, and determining a normalized phoneme duration of the each phoneme based on the word duration corresponding to the sample audio data and the phoneme duration of the each phoneme in the sample word that have been obtained.

For instance, in step S212, the specific implementation and process of obtaining the word duration corresponding to the sample audio data based on the sample audio data may refer to the related description of the aforementioned step S202, and will not be repeated here.

For instance, in some embodiments, a forced alignment operation can be performed on the sample audio data and the sample word by using a predetermined acoustic model, so as to determine the correspondence between each phoneme in the sample word and a part of audio data (e.g., an audio segment) in the sample audio data, and to take a time length of the part of audio data corresponding to the each phoneme as the phoneme duration of the each phoneme.

Figure 5:
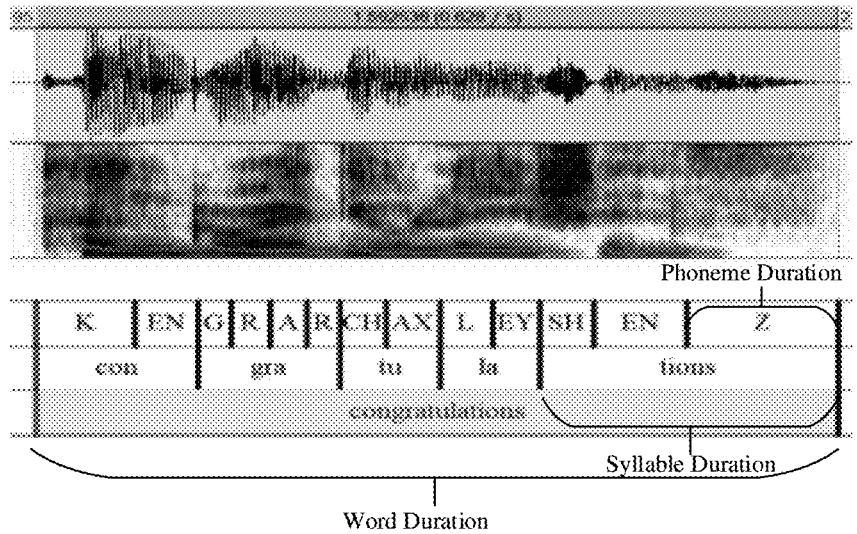
FIG. 5 is a schematic diagram of an audio segmentation of a word provided by at least one embodiment of the present disclosure.

FIG. 5 is a schematic diagram of an audio segmentation of a word provided by at least one embodiment of the present disclosure. In FIG. 5, the word "congratulations" is taken as an example. The audio data corresponding to the word "congratulations" is segmented by a forced alignment operation, so that the word duration corresponding to the word "congratulations", the syllable duration corresponding to each syllable in the word "congratulations" and the phoneme duration corresponding to each phoneme in the word "congratulations" can be determined.

For instance, in some embodiments, a normalized phoneme duration of each phoneme in the sample word can be calculated according to the following formula (4):

$$ti = Ti/Tw \quad (4),$$

where ti represents a normalized phoneme duration of any one phoneme in the sample word, Ti represents a phoneme duration of the any one phoneme in the sample word, and Tw represents a word duration of the sample word.

Step S213: clustering all normalized phoneme durations to obtain at least one phoneme group.

For instance, in some embodiments, the K-means clustering algorithm or any other commonly used clustering algorithm can be used to cluster all normalized phoneme durations to obtain at least one phoneme group. For instance, in practical applications, the at least one phoneme group described above usually includes a plurality of phoneme groups, and each phoneme group includes at least one phoneme.

Step S214: taking the at least one phoneme group as a problem set, and performing a decision tree clustering on each phoneme, so as to obtain a clustering state corresponding to each phoneme.

For instance, in some embodiments, a decision tree clustering can be performed on each of all kinds of phonemes in the language to which the sample word belongs (e.g., English, German, Chinese, etc.), so as to obtain the clustering state corresponding to each phoneme.

For instance, in some embodiments, the decision tree clustering in step S214 can include the following steps: with respect to each phoneme, establishing a tree, putting all the normalized phoneme duration data corresponding to the phoneme at a root node, taking the at least one phoneme group obtained in step S213 as the problem set, and training the problem set in rounds; if a certain problem can make the normalized phoneme duration data set at the root node of the phoneme form an optimum two-category classification, splitting the data set into two categories; recursively conducting the above process until the number of leaf nodes meets a preset threshold value, then stop splitting, completing the decision tree clustering and taking the leaf nodes as the clustering states.

It should be noted that the above steps of the decision tree clustering are illustrative, and those skilled in the art can select appropriate methods and steps according to actual needs to realize the decision tree clustering in step S214.

Step S215: establishing a Gamma mixed model of accent duration corresponding to each phoneme based on the clustering state corresponding to each phoneme.

For instance, in some embodiments, the EM algorithm or any other commonly used algorithm can be adopted to obtain the Gamma mixed model of accent duration corresponding to each phoneme (i.e., to solve or estimate the parameters of the model). For instance, the Gamma mixed model of accent duration corresponding to a certain phoneme can be expressed as:

$$f(t) = \sum_{s=1}^{S} q_s \text{Gamma}(t \mid (\alpha_s, \beta_s)), \quad (5)$$

where f(t) represents a probability density function of a Gamma mixed model of accent duration, Gamma(t|($\alpha_s,\beta_s$)) represents a single Gamma distribution model with the mean of $\alpha_s/\beta_s$ and the variance of $\alpha_s/\beta_s^2$, and $q_s$ is a weight coefficient of Gamma(t|($\alpha_s,\beta_s$)), $$q_s > 0, \sum_{s=1}^{S} q_s = 1,$$

and S represents the number of single Gamma distribution models. A single Gamma distribution model can be expressed as:

$$\text{Gamma}(t \mid (\alpha_s, \beta_s)) = \frac{1}{\Gamma(\alpha_s)} \beta_s^{\alpha_s} t^{\alpha_s-1} e^{-\beta_s t} \quad (6)$$

where Γ(·) represents a Gamma function.

Figure 6:
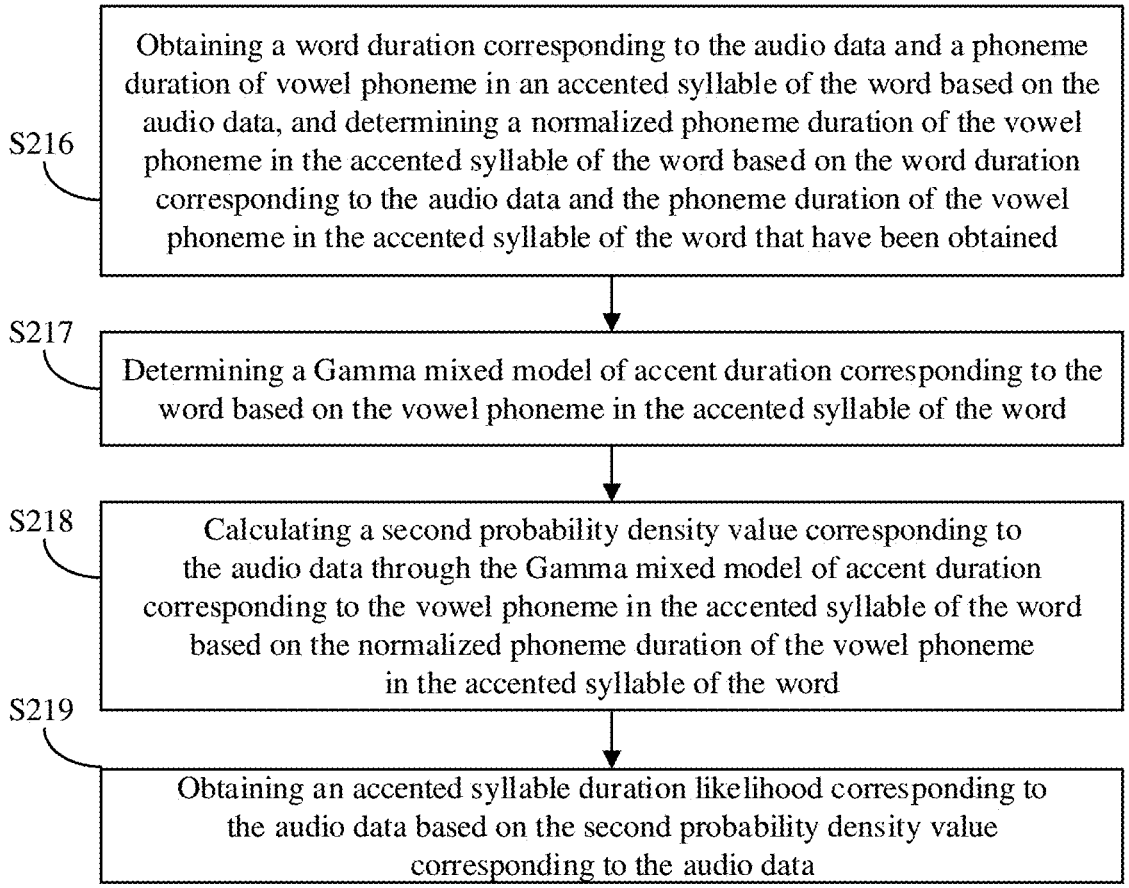
FIG. 6 is a flowchart of extracting an accented syllable duration likelihood corresponding to audio data provided by at least one embodiment of the present disclosure.

FIG. 6 is a flowchart of extracting an accented syllable duration likelihood corresponding to audio data provided by at least one embodiment of the present disclosure. For instance, in some embodiments, as illustrated in FIG. 6, the determining the Gamma mixed model of accent duration corresponding to the word may include steps S216 to S217.

Step S216: obtaining a word duration corresponding to the audio data and a phoneme duration of vowel phoneme in an accented syllable of the word based on the audio data, and determining a normalized phoneme duration of the vowel phoneme in the accented syllable of the word based on the word duration corresponding to the audio data and the phoneme duration of the vowel phoneme in the accented syllable of the word that have been obtained.

For instance, a specific implementation manner and process of step S216 can be referred to the related description of the aforementioned step S212, and details will not be repeated here. It should be understood that because the word are known, by a forced alignment operation, a part of the audio data (such as a certain audio segment) corresponding to the accented syllable in the word can be determined, and a part of the audio data corresponding to the vowel phoneme in the accented syllable of the word can also be determined, so that a time length of the part of the audio data corresponding to the vowel phoneme in the accented syllable of the word can be taken as the phoneme duration of the vowel phoneme in the accented syllable of the word.

Step S217: determining a Gamma mixed model of accent duration corresponding to the word based on the vowel phoneme in the accented syllable of the word.

For instance, as illustrated in FIG. 6, the extracting the accented syllable duration likelihood corresponding to the audio data based on the Gamma mixed model of accent duration corresponding to the word includes steps S218-S219.

Step S218: calculating a second probability density value corresponding to the audio data through the Gamma mixed model of accent duration corresponding to the vowel phoneme in the accented syllable of the word based on the normalized phoneme duration of the vowel phoneme in the accented syllable of the word.

For instance, in step S218, the normalized phoneme duration (obtained from step S216) of the vowel phoneme in the accented syllable of the word can be substituted into the Gamma mixed model of accent duration (referring to the aforementioned formula (5)) corresponding to the vowel phoneme (obtained from step S216) in the accented syllable of the word, so as to obtain the second probability density value corresponding to the audio data, that is, f(t) represents the second probability density value corresponding to the audio data.

Step S219: obtaining an accented syllable duration likelihood corresponding to the audio data based on the second probability density value corresponding to the audio data.

For instance, in step S219, the accented syllable duration likelihood corresponding to the audio data can be calculated according to the following formula (7):

$$F2 = \arctan(\log(f(t))) \tag{7},$$

where F2 represents the accented syllable duration likelihood, $\log(\cdot)$ represents a logarithm function with a base of 10, and $\arctan(\cdot)$ represents an arctangent function.

For instance, in some embodiments, the accented syllable duration likelihood F2 can be directly taken as an element of the prosodic feature vector. For instance, in some other embodiments, the accented syllable duration likelihood F2 can be taken as an element of the prosodic feature vector after being normalized with mean-variance.

For instance, in some embodiments, the prosodic feature further includes a ratio of the accented syllable duration likelihood to the word duration likelihood, that is, an element of the prosodic feature vector further includes the ratio of the accented syllable duration likelihood to the word duration likelihood. On the basis of extracting the word duration likelihood and the accented syllable duration likelihood described above, the extracting the prosodic feature of the audio data can further include: obtaining a ratio of the accented syllable duration likelihood to the word duration likelihood corresponding to the audio data based on the word duration likelihood corresponding to the audio data and the accented syllable duration likelihood corresponding to the audio data.

For instance, in some examples, the ratio of the accented syllable duration likelihood to the word duration likelihood corresponding to the audio data can be calculated according to the following formula (8).

$$F3 = F2/F1 \tag{8},$$

where F3 represents the ratio of the accented syllable duration likelihood to the word duration likelihood.

For instance, in some embodiments, the ratio F3 of the accented syllable duration likelihood to the word duration likelihood can be directly taken as an element of the prosodic feature vector. For instance, in some other embodiments, the ratio F3 of the accented syllable duration likelihood to the word duration likelihood can be taken as an element of the prosodic feature vector after being normalized with mean-variance.

For instance, in some embodiments, the prosodic feature further includes a slope of word fundamental frequency, that is, an element of the prosodic feature vector further includes the slope of word fundamental frequency. The extracting the prosodic feature of the audio data can include: extracting a slope of word fundamental frequency corresponding to the audio data.

For instance, in some embodiments, the extracting the slope of word fundamental frequency corresponding to the audio data can include the following steps: framing the audio data; calculating a value of a fundamental frequency of each frame by autocorrelation algorithm, cepstrum method or any other commonly used algorithm; and linearly fitting the values of the fundamental frequencies of the frames to obtain a slope F4 of word fundamental frequency.

For instance, in some examples, the duration of each frame is 25 ms-35 ms, and the frame shift is 10 ms-15 ms, and the embodiments of the present disclosure include but are not limited thereto. For instance, autocorrelation algorithm, cepstrum method and the any other method for calculating the value of the fundamental frequency can be referred to the related technologies in the field of speech recognition, and no further description will be given here.

For instance, in some embodiments, the slope F4 of word fundamental frequency can be directly taken as an element of the prosodic feature vector. For instance, in some other embodiments, the slope F4 of word fundamental frequency can be taken as an element of the prosodic feature vector after being normalized with mean-variance.

For instance, in some embodiments, the prosodic feature further includes short-term energy variance of accented syllable, that is, an element of the prosodic feature vector further include the short-term energy variance of accented syllable. The extracting the prosodic feature of the audio data can include: determining an audio segment corresponding to an accented syllable in the word based on the audio data; and sequentially performing a framing operation, a frequency domain transformation operation and a Bark domain transformation operation on the audio segment corresponding to the accented syllable in the word, and extracting a short-term energy variance of accented syllable corresponding to the audio data within a predetermined Bark domain frequency band.

For instance, in some embodiments, a part of the audio data (such as an audio segment) corresponding to the accented syllable of the word can be determined by a forced alignment operation. For instance, in some embodiments, the audio segment corresponding to the accented syllable of the word can be divided into multiple frames. For instance, the duration of each frame is 25 ms-35 ms, and the frame shift is 10 ms-15 ms, and the embodiments of the present disclosure include but are not limited thereto. For instance, in some embodiments, Fourier transform algorithm and the like can be adopted to perform the frequency domain transformation operation on each frame which has been obtained by framing, and then the Bark domain transformation operation can be performed according to the following formula (9):

$$f_{Bark} = 8.7 + 14.2 * \log(f_L/1000) \tag{9},$$

where $f_{Bark}$ represents a frequency in the Bark domain, $f_L$ represents a frequency before the Bark domain transformation operation (a frequency in the linear frequency domain), and $\log(\cdot)$ represents a logarithmic function with a base of 10.

For instance, in some embodiments, the energy of each frame can be calculated within a predetermined Bark domain frequency band, and then the variance of the energies of the frames can be calculated, that is, the short-term energy variance F5 of accented syllable corresponding to the audio data can be obtained.

In research, the inventors of the present application have found: the frequency band less than 50 Hz is easy to be mixed with a constant frequency noise, thus the feature component extracted from the frequency band less than 50 Hz is easy to be affected by the constant frequency noise, which may not be conducive to improving the accuracy of accent detection; moreover, the frequency band greater than 500 Hz is usually low in energy, thus the feature component extracted from the frequency band greater than 500 Hz is usually unstable, which may not be conducive to improving the accuracy of accent detection. Therefore, in some examples, the predetermined Bark domain frequency band can include Bark domain frequency channels between 50 Hz and 500 Hz. It should be understood that using the frequency band of Bark domain of [50 Hz, 500 Hz] described above can reduce the amount of computation compared with using all the frequency bands of Bark domain, thereby improving the computational efficiency. It should be noted that the embodiments of the present disclosure include but are not limited thereto, and in practical applications, the predetermined Bark domain frequency band can also be selected as needed.

For instance, in some embodiments, the short-term energy variance F5 of accented syllable can be directly taken as an element of the prosodic feature vector. For instance, in some other embodiments, the short-term energy variance F5 of accented syllable can be taken as an element of the prosodic feature vector after being normalized with mean-variance.

For instance, in some embodiments, the prosodic feature further includes an average fundamental frequency ratio of an accented audio group to an unaccented audio group, that is, an element of the prosodic feature vector further includes the average fundamental frequency ratio of the accented audio group to the unaccented audio group. The extracting the prosodic feature of the audio data can include: performing a syllable segmentation on the audio data according to an accented vowel phoneme and an unaccented vowel phoneme of the word, so as to obtain an accented audio group including an accented audio segment and an unaccented audio group including an unaccented audio segment; calculating an average fundamental frequency value of the accented audio group and an average fundamental frequency value of the unaccented audio group; and obtaining the average fundamental frequency ratio of the accented audio group to the unaccented audio group corresponding to the audio data based on the average fundamental frequency value of the accented audio group and the average fundamental frequency value of the unaccented audio group.

For instance, in some embodiments, the audio data can be syllabically segmented according to the accented vowel phoneme and the unaccented vowel phoneme of the word by a forced alignment operation. For instance, in some examples, as illustrated in FIG. 5, the word "congratulations" is taken as an example. After performing the syllable segmentation by a forced alignment operation, five audio segments can be obtained, and the five audio segments correspond to syllables "con," "gra," "tu," "la," and "tions," respectively. The word "congratulations" is accented at the syllable of "la", so that an accented audio group including one accented audio segment (corresponding to "la") and an unaccented audio group including four unaccented audio segments (corresponding to "con," "gra," "tu," and "tions," respectively) can be obtained.

For instance, in some embodiments, autocorrelation algorithm, cepstrum method or any other commonly used algorithm can be adopted to calculate the fundamental frequency value of each audio segment in the accented audio group or unaccented audio group, and then the average fundamental frequency value of all audio segments in the accented audio group or unaccented audio group can be obtained, that is, the average fundamental frequency value of the accented audio group or unaccented audio group can be obtained accordingly. It should be understood that in the case where only one audio segment is included in the accented audio group or unaccented audio group, the fundamental frequency value of this audio segment can be directly taken as the average fundamental frequency value of the accented audio group or unaccented audio group.

For instance, in some embodiments, a ratio of the average fundamental frequency value of the accented audio group to the average fundamental frequency value of the unaccented audio group can be taken as the average fundamental frequency ratio F6 of the accented audio group to the unaccented audio group corresponding to the audio data.

For instance, in some embodiments, the average fundamental frequency ratio F6 of the accented audio group to the unaccented audio group can be directly taken as an element of the prosodic feature vector. For instance, in some other embodiments, the average fundamental frequency ratio F6 of the accented audio group to the unaccented audio group can be taken as an element of the prosodic feature vector after being normalized with mean-variance.

For instance, in some embodiments, the prosodic feature further includes an average energy ratio of an accented audio group to an unaccented audio group, that is, an element of the prosodic feature vector further includes the average energy ratio of the accented audio group to the unaccented audio group. The extracting the prosodic feature of the audio data can include: performing a syllable segmentation on the audio data according to an accented vowel phoneme and an unaccented vowel phoneme of the word, so as to obtain an accented audio group including an accented audio segment and an unaccented audio group including an unaccented audio segment; calculating an average energy value of the accented audio group and an average energy value of the unaccented audio group; and obtaining an average energy ratio of the accented audio group to the unaccented audio group corresponding to the audio data based on the average energy value of the accented audio group and the average energy value of the unaccented audio group.

For instance, in some embodiments, the audio data can be syllabically segmented according to the accented vowel phoneme and the unaccented vowel phoneme of the word by a forced alignment operation, so as to obtain an accented audio group including an accented audio segment and an unaccented audio group including an unaccented audio segment. For instance, this step can be referred to the related description of the operation of extracting the average fundamental frequency ratio F6 of the accented audio group to the unaccented audio group, and details will not be repeated here.

For instance, in some embodiments, the square of an amplitude of each audio segment in the accented audio group or unaccented audio group can be integrated (or summed), and then be divided by the duration of the each audio segment, so as to obtain the average energy value of the each audio segment in the accented audio group or unaccented audio group. Then, the average energy values of all audio segments in the accented audio group or unaccented audio group are averaged to obtain an average energy value of the accented audio group or unaccented audio group accordingly. It should be understood that in the case where only one audio segment is included in the accented audio group or unaccented audio group, the average energy value of this audio segment can be directly taken as the average energy value of the accented audio group or unaccented audio group.

For instance, in some embodiments, a ratio of the average energy value of the accented audio group to the average energy value of the unaccented audio group can be taken as the average energy ratio F7 of the accented audio group to the unaccented audio group corresponding to the audio data.

For instance, in some embodiments, the average energy ratio F7 of accented audio group to the unaccented audio group can be directly taken as an element of the prosodic feature vector. For instance, in some other embodiments, the average energy ratio F7 of the accented audio group to the unaccented audio group can be taken as an element of the prosodic feature vector after being normalized with mean-variance.

For instance, in some embodiments, the prosodic feature further includes at least one mode component, that is, an element of the prosodic feature vector further includes the at least one mode component. The extracting the prosodic feature of the audio data can include: determining an audio segment corresponding to an accented syllable in the word based on the audio data; sequentially performing a framing operation, a frequency domain transformation operation and a Bark domain transformation operation on the audio segment corresponding to the accented syllable in the word, and performing a time domain transformation operation on signals within a predetermined Bark domain frequency band to obtain an intermediate waveform; and performing empirical mode decomposition (EMD) on the intermediate waveform to obtain at least one mode component corresponding to the audio data.

For instance, in some embodiments, the determining the audio segment corresponding to the accented syllable in the word based on the audio data, and the sequentially performing the framing operation, the frequency domain transformation operation and the Bark domain transformation operation on the audio segment corresponding to the accented syllable in the word, can be referred to the related description of the operation of extracting the short-term energy variance F5 of accented syllable corresponding to the audio data, and details will not be repeated here.

For instance, in some embodiments, the predetermined Bark domain frequency band can include Bark domain frequency channels between 50 Hz and 500 Hz, and the embodiments of the present disclosure include but are not limited thereto. For instance, in some embodiments, the inverse Fourier transform algorithm can be adopted to perform the time domain transformation operation on signals within the predetermined Bark domain frequency band to obtain the intermediate waveform.

The specific implementation process of the empirical mode decomposition method can be referred to the related description of the existing time-frequency analysis methods, and no further description will be given here.

For instance, in some embodiments, the at least one mode component corresponding to the audio data can include the first three mode components obtained by empirical mode decomposition, which are denoted as a first mode component F8, a second mode component F9, and a third mode component F10, respectively.

For instance, in some embodiments, the first mode component F8, the second mode component F9, and the third mode component F10 can be directly taken as elements of the prosodic feature vector, respectively. For instance, in some other embodiments, the first mode component F8, the second mode component F9, and the third mode component F10, after being normalized with mean-variance, can be taken as elements of the prosodic feature vector, respectively.

It should be noted that in the present disclosure, it is illustrative that the at least one mode component includes the first three mode components obtained by empirical mode decomposition. According to actual needs, the at least one mode component can include more or fewer mode components, and accordingly, elements of the prosodic feature vector can further include more or fewer mode components, without being limited in the embodiments of the present disclosure.

For instance, in some embodiments, the extracting the prosodic feature of the audio data can include: extracting at least one selected from the group consisting of a word duration, a word energy, and a word fundamental frequency that correspond to the audio data.

For instance, in some examples, a forced alignment operation can be performed on the audio data and the word by using a predetermined acoustic model, so as to determine the pronunciation segment in the audio data corresponding to the word, and to take a time length of the pronunciation segment as the word duration F11 corresponding to the audio data. For instance, in some examples, the square of the amplitude of the pronunciation segment in the audio data can be integrated (or summed) to obtain the word energy F12 corresponding to the audio data. For instance, in some examples, autocorrelation algorithm, cepstrum method or any other commonly used algorithm can be adopted to calculate a fundamental frequency value of the pronunciation segment in the audio data, so as to obtain the word fundamental frequency F13 corresponding to the audio data.

For instance, in some embodiments, the word duration F11, the word energy F12 and the word fundamental frequency F13 can be directly taken as elements of the prosodic feature vector, respectively. For instance, in some other embodiments, the word duration F11, the word energy F12 and the word fundamental frequency F13, after being normalized with mean-variance, can be taken as elements of the prosodic feature vector, respectively.

For instance, in some embodiments, the extracting the prosodic feature of the audio data can further includes: extracting at least one selected from the group consisting of a short-term average zero-crossing rate, MFCC, first-order MFCC, second-order MFCC and the like that correspond to the audio data. For instance, the extracting methods of the short-term average zero-crossing rate, the MFCC, the first-order MFCC, the second-order MFCC, etc., can be referred to the related technologies in the field of speech recognition, and no further description will be given here.

For instance, in some embodiments, elements of the prosodic feature vector obtained in step S200 can include one or more (including all) of all the prosodic features mentioned above. For instance, in some examples, the elements of the prosodic feature vector obtained in step S200 can include the word duration likelihood F1, the accented syllable duration likelihood F2, the ratio F3 of the accented syllable duration likelihood to the word duration likelihood, the slope F4 of word fundamental frequency, the short-term energy variance F5 of accented syllable, the average fundamental frequency ratio F6 of accented audio group to unaccented audio group, the average energy ratio F7 of accented audio group to unaccented audio group, the first mode component F8, the second mode component F9, the third mode component F10, the word duration F11, the word energy F12, and the word fundamental frequency F13. It should be noted that the embodiments of the present disclosure include but are not limited thereto.

Step S300: generating a spectrogram based on the audio data to obtain a speech spectrum feature matrix.

For instance, in some embodiments, a short-term Fourier transform algorithm can be adopted to generate a spectrogram based on the audio data, and then a speech spectrum feature matrix can be obtained based on the generated spectrogram. It should be noted that the embodiments of the present disclosure include but are not limited thereto.

Figure 7:
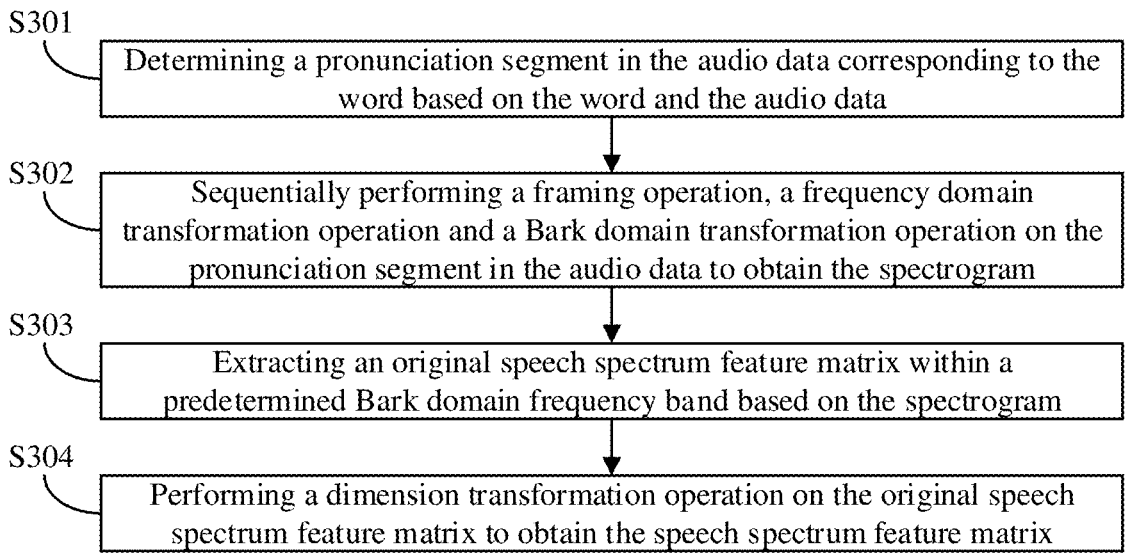
FIG. 7 is a flowchart of extracting a speech spectrum feature matrix provided by at least one embodiment of the present disclosure.

FIG. 7 is a flowchart of extracting a speech spectrum feature matrix provided by at least one embodiment of the present disclosure. For instance, in some embodiments, as illustrated in FIG. 7, the generating the spectrogram based on the audio data to obtain the speech spectrum feature matrix, that is, step S300, can include steps S301 to S304.

Step S301: determining a pronunciation segment in the audio data corresponding to the word based on the word and the audio data.

For instance, in some embodiments, a forced alignment operation can be performed on the audio data and the word by using a predetermined acoustic model, so as to determine the pronunciation segment in the audio data corresponding to the word.

Step S302: sequentially performing a framing operation, a frequency domain transformation operation and a Bark domain transformation operation on the pronunciation segment in the audio data to obtain the spectrogram.

For instance, the specific implementation processes and methods of the operations such as framing, frequency domain transformation and Bark domain transformation in step S302 can be referred to the related description of the aforementioned step of extracting the short-term energy variance of accented syllable, and details will not be repeated here.

Step S303: extracting an original speech spectrum feature matrix within a predetermined Bark domain frequency band based on the spectrogram.

For instance, in some embodiments, the predetermined Bark domain frequency band can include Bark domain frequency channels between 50 Hz and 500 Hz, and the present disclosure includes but is not limited thereto. For instance, in some embodiments, the spectrogram can be sampled within the predetermined Bark domain frequency band to obtain the original speech spectrum feature matrix.

For instance, in some embodiments, the original speech spectrum feature matrix has a dimension of A*B (both A and B are positive integers), that is, the original speech spectrum feature matrix includes A*B elements. The value of A is related to the number of Bark domain frequency channels within the predetermined Bark domain frequency band. For instance, A is usually be set to a fixed value, such as 64. B is related to the framing operation in step S302. The value of B is equal to the number of frames obtained by framing the pronunciation segment in the audio data. With regard to different words, the word durations (that is, a duration of the pronunciation segment) are usually different, thus B is usually a variable value. Therefore, the dimension of the original speech spectrum feature matrix is not fixed, which is not conducive to establishing a unified classifier model for subsequent classifying process. In order to solve this problem, the following step S304 can be performed to obtain a speech spectrum feature matrix with a fixed dimension.

Step S304: performing a dimension transformation operation on the original speech spectrum feature matrix to obtain the speech spectrum feature matrix.

For instance, in some embodiments, the speech spectrum feature matrix has a dimension of U*V (both U and V are positive integers), that is, the speech spectrum feature matrix includes U*V elements. For instance, the dimension transformation operation can be realized by interpolation or sampling. For instance, in the case where U>A, each column vector in the original speech spectrum feature matrix can be interpolated to increase the number of elements of the column vector; in the case where U<A, each column vector in the original speech spectrum feature matrix can be sampled to reduce the number of elements of the column vector; and in the case where U=A, the number of elements of the column vector can be kept unchanged. For instance, in the case where V>B, each row vector in the original speech spectrum feature matrix can be interpolated to increase the number of elements of the row vector; in the case where U<A, each row vector in the original speech spectrum feature matrix can be sampled to reduce the number of elements of the row vector; and in the case where U=A, the number of elements of the row vector can be kept unchanged.

For instance, in some embodiments, in order to balance the detection accuracy and detection efficiency of the accent detection method provided by the embodiments of the present disclosure, the value ranges of U and V in the spectrum feature matrix can be set as [150, 250]. It should be noted that in practical applications, the value range of U and V can be set as needed. For instance, in some embodiments, U and V are both 200.

Step S400: performing a concatenate operation on the prosodic feature vector and the speech spectrum feature matrix to obtain a first feature matrix, and performing a redundancy removal operation on the first feature matrix to obtain a second feature matrix.

For instance, in some embodiments, step S400 can include: performing a mean-variance normalization processing on the prosodic feature vector (obtained in step S200) and the speech spectrum feature matrix (obtained in step S300), respectively, so as to obtain a mean-variance normalized prosodic feature vector and a mean-variance normalized speech spectrum feature matrix, respectively; and performing the concatenate operation on the mean-variance normalized prosodic feature vector and the mean-variance normalized speech spectrum feature matrix to obtain the first feature matrix.

For instance, in the embodiments of the present disclosure, the following formula (10) can be used to perform the mean-variance normalization process on any variable y:

$$\hat{y} = \frac{y - \overline{y}}{\sigma_y}, \tag{10}$$

where $\hat{y}$ represents a result obtained by performing a mean-variance normalization processing on variable y, $\overline{y}$ represents a mean of all values of variable y, and $\sigma_y$ represents a standard deviation of all values of variable y.

For instance, when performing the mean-variance normalization process on the prosodic feature vector, each element of the prosodic feature vector can be regarded as the variable y, the mean of the values of the elements in the prosodic feature vector can be regarded as $\overline{y}$, and the standard deviation of the elements in the prosodic feature vector can be regarded as $\sigma_y$. For instance, when performing the mean-variance normalization process on the speech spectrum feature matrix, each element in the speech spectrum feature matrix can be regarded as the variable y, the mean of the elements in a row vector, to which the each element belongs, of the speech spectrum feature matrix, is regarded as $\bar{y}$, and the standard deviation of the elements in the row vector, to which the each element belongs, of the speech spectrum feature matrix, is regarded as $\sigma_y$.

It should be understood that in the mean-variance normalized prosodic feature vector and in the mean-variance normalized speech spectrum feature matrix, the values of the elements are in the same order of magnitude, which is convenient for performing subsequent redundancy removal operations. It should also be understood that the mean-variance normalization process will not affect the dimension of the prosodic feature vector or the dimension of the speech spectrum feature matrix.

For instance, in some embodiments, the mean-variance normalized speech spectrum feature matrix includes a plurality of frequency feature vectors, and for instance, each frequency feature vector is a column vector. The performing the concatenate operation on the mean-variance normalized prosodic feature vector and the mean-variance normalized speech spectrum feature matrix to obtain the first feature matrix can include: performing a dimension transformation operation on the mean-variance normalized prosodic feature vector to obtain a first feature vector, wherein a dimension of the first feature vector is the same as that of any one frequency feature vector in the mean-variance normalized speech spectrum feature matrix; and concatenating the first feature vector and the mean-variance normalized speech spectrum feature matrix to obtain the first feature matrix, wherein the first feature matrix includes the first feature vector and all of the frequency feature vectors in the mean-variance normalized speech spectrum feature matrix.

For instance, the dimension of the prosodic feature vector is Z*1(Z is a positive integer, and for instance, in the case where the prosodic feature vector includes the aforementioned prosodic features F1-F13, Z can be 13), and the dimension of the mean-variance normalized prosodic feature vector is Z*1. The dimension of the spectrum feature matrix is U*V (both U and V are positive integers), the dimension of the mean-variance normalized spectrum feature matrix is U*V, and the frequency feature vector is a column vector, so the dimension of each frequency feature vector is U*1. For instance, the mean-variance normalized prosodic feature vector can be subjected to a dimension transformation operation to obtain the first feature vector, and the dimension of the first feature vector is U*1, that is, the dimension of the first feature vector is the same as that of any one frequency feature vector in the mean-variance normalized speech spectrum feature matrix. For instance, the dimension transformation operation here can include performing cubic spline interpolation on the mean-variance normalized prosodic feature vector to expand the dimension of the mean-variance normalized prosodic feature vector to U*1, thereby obtaining the first feature vector.

For instance, the first feature vector can be concatenated with the mean-variance normalized speech spectrum feature matrix to obtain the first feature matrix, the dimension of the first feature matrix is U*(V+1), that is, the first feature matrix includes the first feature vector and all of the frequency feature vectors in the mean-variance normalized speech spectrum feature matrix.

For instance, in the present embodiment, the performing the redundancy removal operation on the first feature matrix to obtain the second feature matrix can include: obtaining cosine similarities by calculating a cosine similarity between the first feature vector in the first feature matrix and each of the plurality of frequency feature vectors in the first feature matrix; and in response to that any one cosine similarity of the cosine similarities is greater than a first preset value, setting a frequency feature vector, which corresponds to the any one cosine similarity, in the first feature matrix as an all-zero vector or deleting a frequency feature vector, which corresponds to the any one cosine similarity, in the first feature matrix from the first feature matrix, so as to obtain the second feature matrix.

For instance, in some examples, the cosine similarity of two vectors can be calculated according to the following formula (11):

$$Sim = \frac{\vec{J_1} \cdot \vec{J_2}}{\|\vec{J_1}\| \times \|\vec{J_2}\|}, \tag{11}$$

where Sim represents a cosine similarity, $\vec{J_1}$, $\vec{J_2}$ represent two vectors, respectively, and, $\|\vec{J_1}\|$, $\|\vec{J_2}\|$ represent moduli of two vectors, respectively.

For instance, in the embodiment of the present disclosure, the first preset value can be set as needed. For instance, in some examples, a value interval of the first preset value can be set to [0.75, 0.9], and the embodiment of the present disclosure includes but is not limited thereto. For instance, in some examples, the first preset value can be set to 0.75, 0.8, 0.85, 0.9, etc., without being limited in the embodiment of the present disclosure.

For instance, in some other embodiments, the performing the concatenate operation on the mean-variance normalized prosodic feature vector and the mean-variance normalized speech spectrum feature matrix to obtain the first feature matrix can include: concatenating the mean-variance normalized prosodic feature vector and each frequency feature vector in the mean-variance normalized speech spectrum feature matrix, so as to obtain the first feature matrix.

For instance, the dimension of the mean-variance normalized prosodic feature vector is Z*1, and the dimension of the mean-variance normalized speech spectrum feature matrix is U*V. After concatenating the mean-variance normalized prosodic feature vector and each frequency feature vector in the mean-variance normalized speech spectrum feature matrix (the dimension of each frequency feature vector is U*1), the dimension of the obtained first feature matrix is (U+Z)*V.

For instance, in the present embodiment, the performing the redundancy removal operation on the first feature matrix to obtain the second feature matrix can include: obtaining a first weight matrix; processing the first feature matrix by using the first weight matrix to obtain a dimension reduction matrix, wherein a dimension of the dimension reduction matrix is less than that of the first feature matrix; performing a dimension transformation operation on the dimension reduction matrix to obtain a first intermediate feature matrix, wherein a dimension of the first intermediate feature matrix is the same as that of the first feature matrix; converting each element in the first intermediate feature matrix into a preset interval so as to obtain a second intermediate feature matrix; and setting, in response to that any element in the second intermediate feature matrix is less than a second preset value, the any element in the second intermediate feature matrix to zero, so as to obtain a second feature matrix.

For instance, in some examples, the dimension of the first weight matrix is D*(U+Z), and the first weight matrix and the first feature matrix are subjected to a matrix multiplication operation to obtain a dimension reduction matrix, and the dimension of the dimension reduction matrix being obtained is D*V. For instance, in some examples, D is less than (U+Z), so that the dimension of the dimension reduction matrix is less than that of the first feature matrix. It should be noted that in the embodiment of the present disclosure, the value of D can be set according to actual needs. For instance, in some examples, the value interval of D can be set to [8, 12], and the embodiment of the present disclosure includes but is not limited thereto.

For instance, in some examples, the preset interval can be set as needed. For instance, in some examples, the preset interval can be set to [−1, 1], and the embodiment of the present disclosure includes but is not limited thereto. For instance, in some examples, taking that the preset interval is [−1, 1] as an example, each element in the first intermediate feature matrix can be converted into the preset interval [−1, 1] according to the following formula (12):

$$\tilde{r} = 2 \times \frac{r - r_{min}}{r_{max} - r_{min}} + Rand(0, 0.1), \quad (12)$$

$$\hat{r} = \begin{cases} 1, & \tilde{r} \geq 1 \\ \tilde{r}, & -1 < \tilde{r} < 1 \\ -1, & \tilde{r} \leq -1 \end{cases}$$

where r represents any element of the first intermediate feature matrix, $r_{max}$ represents a maximum value of the elements in the first intermediate feature matrix, $r_{min}$ represents a minimum value of the elements in the first intermediate feature matrix, and Rand(0, 0.1) represents a generation function of a random number within the interval of [0, 0.1] (a random number can be generated, and the random number that has been generated is located within the interval of [0, 0.1]), $\hat{r}$ represents an obtained element of the second intermediate feature matrix corresponding to the element r after the element r is converted.

It should be understood that the method of converting each element in the first intermediate feature matrix into the preset interval is not limited in the embodiment of the present disclosure, and any appropriate mathematical model can be adopted by those skilled in the art to realize the above conversion process according to actual needs.

For instance, in some examples, the second preset value can be set as needed. For instance, in some examples, in the case where the preset interval is set to [−1, 1], a value range of the second preset value can be set to, for instance, [0.1, 0.3], and the embodiment of the present disclosure includes but is not limited thereto. For instance, in some examples, the first preset value can be set to 0.1, 0.15, 0.2, 0.25, 0.3, etc., without being limited in the embodiment of the present disclosure. It should be understood that the second preset value should generally be located within the preset interval.

Figure 8:
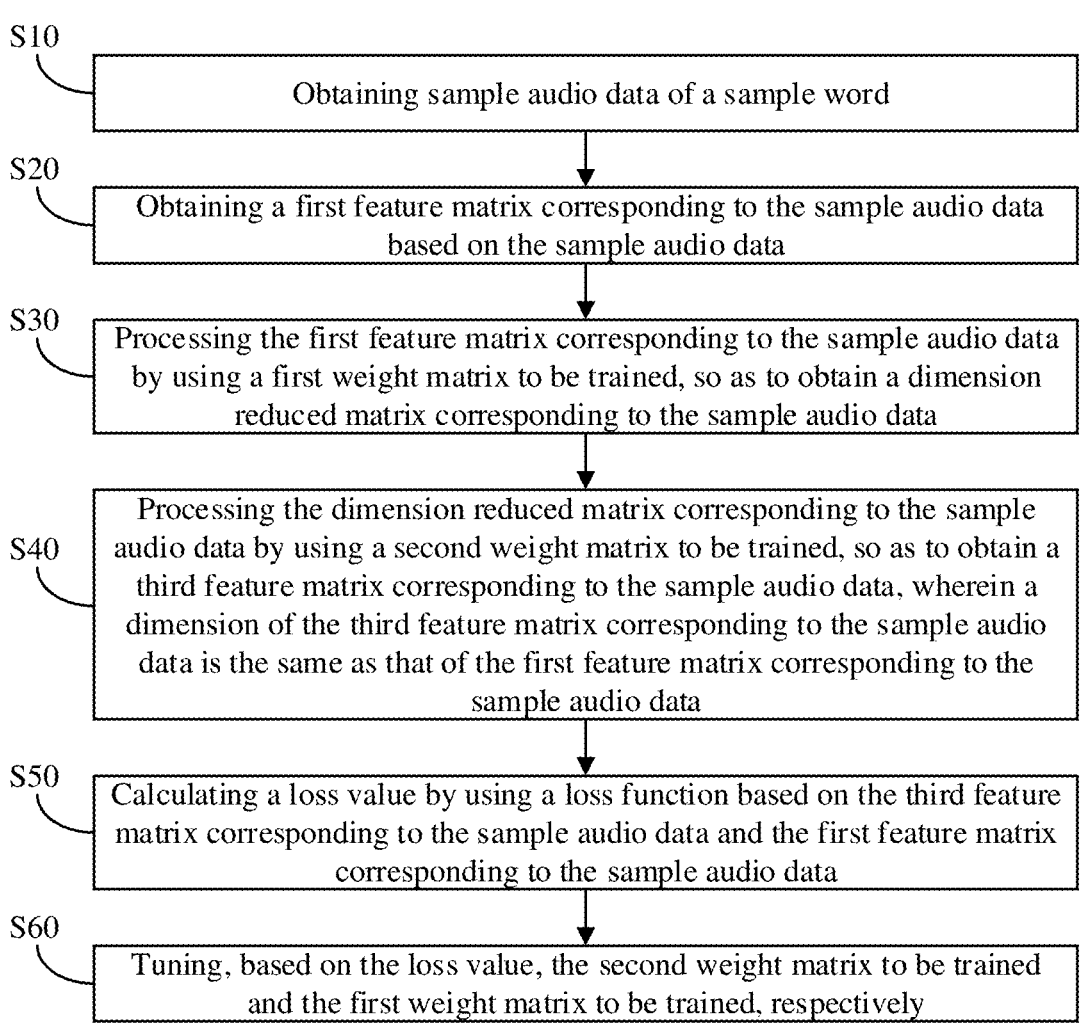
FIG. 8 is a flowchart of pre-training a first weight matrix provided by at least one embodiment of the present disclosure.

For instance, in the present embodiment, the accent detection method can further include: pre-training a first weight matrix to be trained to obtain the first weight matrix. FIG. 8 is a flowchart of pre-training a first weight matrix to be trained provided by at least one embodiment of the present disclosure. For instance, as illustrated in FIG. 8, the pre-training the first weight matrix to be trained can include the following steps S10 to S60.

Step S10: obtaining sample audio data of a sample word;

Step S20: obtaining a first feature matrix corresponding to the sample audio data based on the sample audio data;

Step S30: processing the first feature matrix corresponding to the sample audio data by using a first weight matrix to be trained, so as to obtain a dimension reduction matrix corresponding to the sample audio data;

Step S40: processing the dimension reduction matrix corresponding to the sample audio data by using a second weight matrix to be trained, so as to obtain a third feature matrix corresponding to the sample audio data, wherein a dimension of the third feature matrix corresponding to the sample audio data is the same as that of the first feature matrix corresponding to the sample audio data;

Step S50: calculating a loss value by using a loss function based on the third feature matrix corresponding to the sample audio data and the first feature matrix corresponding to the sample audio data; and Step S60: tuning, based on the loss value, the second weight matrix to be trained and the first weight matrix to be trained, respectively.

For instance, a specific implementation process and method of step S10 can be referred to the related description of the aforementioned step S201, and details will not be repeated here.

For instance, a specific implementation process and method of step S20 can be referred to the related descriptions of step S200, step S300 and step S400 (the case in which the dimension of the obtained first feature matrix is (U+Z)*V), as long as the sample word and the sample audio data here are respectively taken as the word and the audio data in the aforementioned step S200, step S300 and step S400 (the case in which the dimension of the obtained first feature matrix is (U+Z)*V).

For instance, in step S30, the dimension of the first weight matrix is the same as that of the first weight matrix to be trained, which is D*(U+Z). The first weight matrix to be trained and the first feature matrix corresponding to the sample audio data are subjected to a matrix multiplication operation, so that the dimension of the obtained dimension reduction matrix corresponding to the sample audio data is D*V.

For instance, in step S40, the dimension of the second weight matrix to be trained is (U+Z)*D, and therefore, the dimension of the third feature matrix corresponding to the sample audio data, obtained by performing a matrix multiplication operation on the second weight matrix to be trained and the dimension reduction matrix corresponding to the sample audio data, is (U+Z)*V. That is, the dimension of the third feature matrix corresponding to the sample audio data is the same as that of the first feature matrix corresponding to the sample audio data.

For instance, in step S50, the loss function includes but is not limited to a cross entropy loss function.

For instance, in step S60, an error value of an element of the second weight matrix to be trained and an error value of an element of the first weight matrix to be trained can be calculated by using an optimization function, based on the loss value calculated by using the loss function; an element of the first weight matrix is tuned based on the error value of the element of the first weight matrix to be trained, and an element of the second weight matrix is tuned based on the error value of the element of the second weight matrix to be trained. For instance, the optimization function can adopt a batch gradient descent (BGD) algorithm, a stochastic gradient descent (SGD) algorithm and the like to calculate the error value of the element of the second weight matrix to be trained and the error value of the element of the first weight matrix to be trained.

For instance, in some embodiments, the pre-training the first weight matrix to be trained can further include: determining whether the training of the second weight matrix to be trained and the first weight matrix to be trained satisfies a predetermined condition, and if the predetermined condition is not satisfied, repeating the training process (i.e., steps S10 to S60); and if the predetermined condition is satisfied, stopping the training process, and obtaining a trained first weight matrix and a trained second weight matrix, wherein the trained first weight matrix can be taken as the first weight matrix. For instance, in an example, the above predetermined condition is that the loss value corresponding to consecutive two (or more) sample audio data of sample words are no longer significantly reduced. For instance, in another example, the above predetermined condition is that the training epochs or the training cycles of the second weight matrix to be trained and the first weight matrix to be trained reaches a predetermined number. No limitation is imposed thereto by the present disclosure.

For instance, initial values of the elements in the second weight matrix to be trained can be random values, and initial values of the elements in the first weight matrix to be trained can be random values.

For instance, in some embodiments, the pre-training process described above can be realized by, for instance, a universal automatic encoder, and the present disclosure includes but is not limited thereto.

It should be noted that the above embodiment is merely illustrative for the training process of the second weight matrix and the first weight matrix. Those skilled in the art should know that in the training stage, the second weight matrix to be trained and the first weight matrix to be trained need to be trained by using a large amount of sample audio data of sample words. Meanwhile, in the training process of the sample audio data of each sample word, multiple iterations can be included for tuning elements of the second weight matrix to be trained and elements of the first weight matrix to be trained. Moreover, for instance, the training stage can further include: fine-tuning the elements of the second weight matrix to be trained and the elements of the first weight matrix to be trained, so as to obtain more optimized parameters.

It should be understood that the above pre-training process can be referred to the training process of a neural network, as long as the first weight matrix and the second weight matrix are regarded as the weight parameter matrices of a neural network.

It should be noted that the concatenate operation in step S400 can make the accent detection method provided by the embodiment of the present disclosure combine the prosodic feature with the speech spectrum feature for accent detection, which is beneficial to improving the accuracy of accent detection result. Meanwhile, the redundancy removal operation in step S400 can improve the speed and efficiency of the accent detection method.

Step S500: classifying the second feature matrix by a classifier to obtain an accent detection result of the audio data.

For instance, in some embodiments, the classifier in step S500 can adopt a classifier including a convolutional neural network, or any other classifier (for instance, a support vector machine (SVM) classifier, etc.), without being limited in the embodiments of the present disclosure.

For instance, in some embodiments, the classifier in step S500 includes a convolutional neural network and a softmax classifier. The second feature matrix is processed by the convolution neural network and the softmax classifier in turn, and an accent detection result of the audio data is obtained. For instance, in some examples, the softmax classifier is used for binary classification, and an output result thereof can indicate whether the accented syllable in the audio data is stressed or not. For instance, if the output result is 1, it indicates that the accented syllable in the audio data is stressed, and if the output result is 0, it indicates that the accented syllable in the audio data is not stressed. The embodiments of the present disclosure include but are not limited thereto.

It should be understood that, in some embodiments, the classifier in step S500 can be trained before being used for the classifying process in step S500.

It should be noted that in the embodiments of the present disclosure, the classifier can be implemented as software, hardware, firmware or any combination thereof, so as to execute corresponding processing procedures.

It should be noted that, in the embodiments of the present disclosure, the flow of the accent detection method described above more or fewer operations that can be performed sequentially or in parallel. Although the flow of the accent detection method described above includes a plurality of operations in a specific order, it should be clearly understood that the order of the plurality of operations is not limited. In addition, some steps with different serial numbers but the same essence can be executed for only once, and the execution result can be shared by different subsequent steps, and of course, they can be repeatedly executed when necessary. The accent detection method described above can be executed once or multiple times according to predetermined conditions.

According to the accent detection method provided by the embodiments of the present disclosure, accent detection is performed by combining the prosodic feature and the speech spectrum feature, so that the accuracy of the accent detection result can be improved. Meanwhile, the redundancy removal operation can improve the speed and efficiency of the accent detection method.

Figure 9:
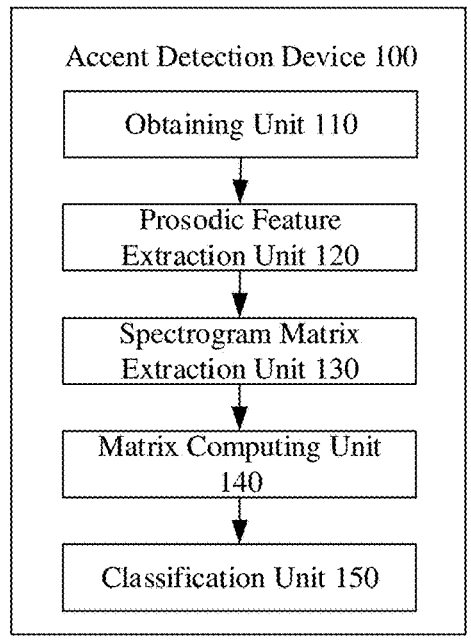
FIG. 9 is a schematic block diagram of an accent detection device provided by at least one embodiment of the present disclosure.

At least one embodiment of the present disclosure further provides an accent detection device. FIG. 9 is a schematic block diagram of an accent detection device provided by at least one embodiment of the present disclosure.

For instance, as illustrated in FIG. 9, the accent detection device 100 includes an obtaining unit 110, a prosodic feature extraction unit 120, a spectrogram matrix extraction unit 130, a matrix computing unit 140, and a classification unit 150. For instance, these units can be implemented by hardware (e.g., circuit) modules or software modules, etc., and the following embodiments are the same in this respect, which will not be repeated. For instance, these units can be realized as a central processing unit (CPU), a graphics processing unit (GPU), a tensor processing unit (TPU), a field programmable gate array (FPGA), or a processing unit in any other form with data processing capability and/or instruction execution capability and corresponding computer instructions.

For instance, the obtaining unit 110 is configured to obtain audio data of a word. For instance, the obtaining unit 110 can implement step S100 of the accent detection method mentioned above, the specific implementation process and method can be refer to the related description of step S100, and details will not be repeated here.

For instance, the prosodic feature extraction unit 120 is configured to extract a prosodic feature of the audio data to obtain a prosodic feature vector. For instance, the prosodic feature extraction unit 120 can implement step S200 of the accent detection method mentioned above, the specific implementation process and method can be referred to the related description of step S200, and details will not be repeated here.

For instance, the spectrogram matrix extraction unit 130 is configured to generate a spectrogram based on the audio data to obtain a speech spectrum feature matrix. For instance, the spectrogram matrix extraction unit 130 can implement step S300 of the accent detection method mentioned above, the specific implementation process and method can be referred to the related description of step S300, and details will not be repeated here.

For instance, the matrix computing unit 140 is configured to perform a concatenate operation on the prosodic feature vector and the speech spectrum feature matrix to obtain a first feature matrix, and configured to perform a redundancy removal operation on the first feature matrix to obtain a second feature matrix. For instance, the matrix computing unit 140 cam implement step S400 of the accent detection method mentioned above, the specific implementation process and method can be referred to the related description of step S400, and details will not be repeated here.

For instance, the classification unit 150 is configured to classify the second feature matrix to obtain an accent detection result of the audio data. For instance, the classification unit 150 includes a classifier. For instance, the classification unit 150 can implement step S500 of the accent detection method mentioned above, the specific implementation process and method can be referred to the related description of step S500, and details will not be repeated here.

It should be noted that, in the embodiment of the present disclosure, the accent detection device 100 can include more or fewer circuits or units, and the connection relationships between circuits or units are not limited, and can be determined according to actual needs. The specific configuration of each circuit is not limited, and each circuit can be formed of analog devices, or digital chips, or be formed in any other suitable way, according to the circuit principle.

Figure 10:
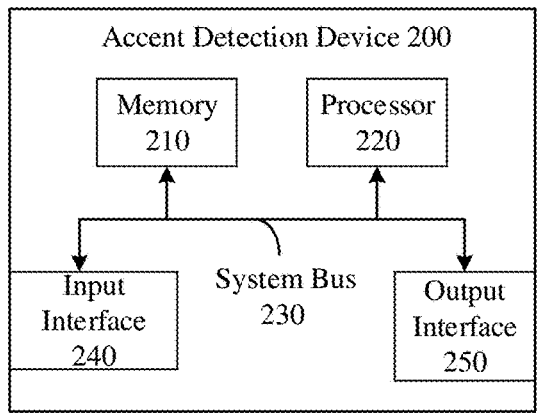
FIG. 10 is a schematic block diagram of another accent detection device provided by at least one embodiment of the present disclosure.

FIG. 10 is a schematic block diagram of another accent detection device provided by at least one embodiment of the present disclosure. For instance, as illustrated in FIG. 10, the accent detection device 200 includes a memory 210 and a processor 220.

For instance, the memory 210 is configured to non-transitorily store computer readable instructions, and the processor 220 is configured to execute the computer readable instructions. Upon the computer readable instructions being executed by the processor 220, the accent detection method provided by any one of the embodiments of the present disclosure is executed.

For instance, the memory 210 and the processor 220 may communicate with each other directly or indirectly. For instance, in some examples, as illustrated in FIG. 10, the accent detection device 200 can further include a system bus 230, and the memory 210 and the processor 220 can communicate with each other through the system bus 230. For instance, the processor 220 can access the memory 210 through the system bus 230. For instance, in some other examples, components such as the memory 210 and the processor 220 can communicate with each other via network connection. The network can include a wireless network, a wired network, and/or any combination of the wireless network and the wired network. The network can include local area network (LAN), the Internet, a telecommunication network, Internet of Things based on the Internet and/or the telecommunication network, and/or any combination of the above networks, etc. The wired network, for example, can communicate by means of twisted pair, coaxial cable or optical fiber transmission, etc. The wireless network, for example, can adopt a communication mode such as 3G/4G/5G mobile communication network, Bluetooth, Zigbee or WiFi, etc. The present disclosure does not limit the type and function of the network.

For instance, the processor 220 can control other components in the accent detection device to realize desired functions. The processor 220 can be an element having data processing capability and/or program execution capability, such as a central processing unit (CPU), a tensor processing unit (TPU), or a graphics processing unit (GPU). The CPU can have an X86 or ARM architecture, etc. The GPU can be integrated directly on the motherboard alone or built into the Northbridge chip of the motherboard. The GPU can also be built into the CPU.

For instance, the memory 210 can include one or a plurality of computer program products, and the computer programs can include a computer readable storage medium of diverse forms, such as a volatile memory and/or a non-volatile memory. The volatile memory, for instance, can include a random access memory (RAM) and/or a cache, etc. The non-volatile memory, for example, can include a read-only memory (ROM), a hard disk, an erasable programmable read-only memory (EPROM), a portable compact disk read-only memory (CD-ROM), a USB memory, or a flash memory, etc.

For instance, one or a plurality of computer instructions can be stored on the memory 210, and the processor 220 can execute the computer instructions to realize various functions. The computer readable storage medium can also store various application programs and various data, such as the prosodic feature vector, the speech spectrum feature matrix, the first feature matrix, the second feature matrix, and various data used and/or generated by the application programs.

For instance, upon some computer instructions stored in the memory 210 being executed by the processor 220, one or more steps in the accent detection method described above can be executed.

For instance, as illustrated in FIG. 10, the accent detection device 200 can further include an input interface 240 that allows an external device to communicate with the accent detection device 200. For instance, the input interface 240 can be configured to receive instructions from an external computer device and a user, etc. The accent detection device 500 can further include an output interface 250 that allows the accent detection device 200 to be connected with one or more external devices. For instance, the accent detection device 200 can display the accent detection result and the like through the output interface 250. The external devices that communicate with the accent detection device 200 through the input interface 240 and/or the output interface 250 can be included in an environment that provides a user interface of any type with which the user can interact with the external devices. Examples of the types of user interfaces include graphical user interface (GUI), natural user interface, etc. For instance, the GUI can receive an input from a user via an input device such as a keyboard, a mouse, a remote controller, and the like, and provide an output on an output device such as a display. In addition, the natural user interface can enable a user to interact with the accent detection device 200 in a manner that is not constrained by input devices such as keyboards, mice and remote controllers. In contrast, the natural user interface can rely on voice recognition, touch and stylus recognition, gesture recognition on and near the screen, aerial gesture, head and eye tracking, speech and semantics, vision, touch, gesture, and machine intelligence, etc.

For instance, in some embodiments, the accent detection device 200 further includes the audio acquisition device described in the embodiments of the accent detection method.

Moreover, although the accent detection device 200 is illustrated as an individual system in FIG. 10, it should be understood that the accent detection device 200 can also be a distributed system and can also be deployed as a cloud facility (including public cloud or private cloud). Thus, for instance, a plurality of devices can communicate with each other via network connection and execute the tasks that are described to be executed by the accent detection device 200 together. For instance, in some examples, the audio data of the word can be acquired by a smart phone and be uploaded to a server, and after the server executes the accent detection process, an accent detection result is returned to the smart phone for a user.

For instance, for a detailed description of the implementation process of the accent detection method, reference may be made to the relevant description of the above-mentioned embodiments of the accent detection method, and the repeated descriptions are omitted here.

For instance, in some examples, the accent detection device can include, but is not limited to, a smart phone, a tablet computer, a personal computer, a personal digital assistant (PDA), a wearable device, a head-mounted display device, etc.

It should be noted that the accent detection device provided by the embodiments of the present disclosure is illustrative but not limitative, and the accent detection device can also include other conventional components or structures according to actual application requirements. For instance, in order to implement necessary functions of the accent detection device, those skilled in the art can set other conventional components or structures according to specific application scenarios, which are not limited in the embodiments of the present disclosure.

Technical effects of the accent detection device provided by the embodiments of the present disclosure can be referred to the related description of the accent detection method in the above embodiments, and no further description will be given here.

Figure 11:
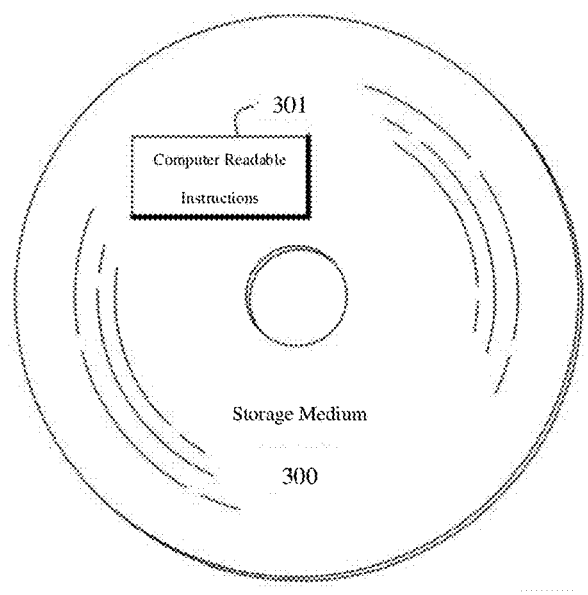
FIG. 11 is a schematic diagram of a storage medium provided by at least one embodiment of the present disclosure.

At least one embodiment of the present disclosure further provides a non-transitory storage medium. FIG. 11 is a schematic diagram of a non-transitory storage medium provided by an embodiment of the present disclosure. For instance, as illustrated in FIG. 11, the non-transitory storage medium 300 stores computer-readable instructions 301 non-transitorily, and upon the non-transitory computer-readable instructions 301 being executed by a computer (including a processor), the instructions for the accent detection method provided by any one of the embodiments of the present disclosure can be executed.

For instance, one or more computer instructions may be stored on the non-transitory storage medium 300. Some computer instructions stored on the non-transitory storage medium 300 can be, for instance, instructions for implementing one or more steps of the accent detection method described above.

For instance, the non-transitory storage medium can include a storage component of a tablet, a hard disk of a personal computer, a random access memory (RAM), a read-only memory (ROM), an erasable programmable read-only memory (EPROM), a portable compact disk read-only memory (CD-ROM), a flash memory, or any combination of the above-mentioned storage media, or other suitable storage medium.

Technical effects of the non-transitory storage medium provided by the embodiments of the present disclosure can be referred to the related description of the accent detection methods provided by the above embodiments, and no further description will be given here.

For the present disclosure, the following statements should be noted:

(1) The accompanying drawings related to the embodiment(s) of the present disclosure involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, and the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be determined based on the protection scope of the claims.

What is claimed is:

1. An accent detection method configured to be executed by a processor, said method comprising:
    obtaining audio data of a word;
    extracting a prosodic feature of the audio data to obtain a prosodic feature vector;
    generating a spectrogram based on the audio data to obtain a speech spectrum feature matrix;
    performing a mean-variance normalization processing on the prosodic feature vector to obtain a mean-variance normalized prosodic feature vector, performing a mean-variance normalization processing on the speech spectrum feature matrix to obtain a mean-variance normalized speech spectrum feature matrix which comprises a plurality of frequency feature vectors, performing a concatenate operation on the mean-variance normalized prosodic feature vector and the mean-variance normalized speech spectrum feature matrix to obtain a first feature matrix, and performing a redundancy removal operation on the first feature matrix to obtain a second feature matrix; and
    classifying the second feature matrix by a classifier to obtain an accent detection result of the audio data; wherein
    the generating the spectrogram based on the audio data to obtain the speech spectrum feature matrix comprises:
    determining a pronunciation segment in the audio data corresponding to the word based on the word and the audio data,
    sequentially performing a framing operation, a frequency domain transformation operation and a Bark domain transformation operation on the pronunciation segment in the audio data to obtain the spectrogram,
    extracting an original speech spectrum feature matrix within a predetermined Bark domain frequency band based on the spectrogram, and performing a dimension transformation operation on the original speech spectrum feature matrix to obtain the speech spectrum feature matrix;

the performing the concatenate operation on the mean-variance normalized prosodic feature vector and the mean-variance normalized speech spectrum feature matrix to obtain the first feature matrix comprises:

performing a dimension transformation operation on the mean-variance normalized prosodic feature vector to obtain a first feature vector, wherein a dimension of the first feature vector is the same as that of any one frequency feature vector in the mean-variance normalized speech spectrum feature matrix, and concatenating the first feature vector and the mean-variance normalized speech spectrum feature matrix to obtain the first feature matrix, wherein the first feature matrix comprises the first feature vector and all of the plurality of frequency feature vectors in the mean-variance normalized speech spectrum feature matrix; or concatenating the mean-variance normalized prosodic feature vector and each of the plurality of frequency feature vectors in the mean-variance normalized speech spectrum feature matrix, so as to obtain the first feature matrix.

2. The accent detection method according to claim 1, wherein in a case where the first feature matrix comprises the first feature vector and all of the plurality of frequency feature vectors in the mean-variance normalized speech spectrum feature matrix, the performing the redundancy removal operation on the first feature matrix to obtain the second feature matrix comprises:

obtaining cosine similarities by calculating a cosine similarity between the first feature vector in the first feature matrix and each of the plurality of frequency feature vectors in the first feature matrix; and in response to that any one cosine similarity of the cosine similarities is greater than a first preset value, setting a frequency feature vector, which corresponds to the any one cosine similarity, in the first feature matrix as an all-zero vector or deleting a frequency feature vector, which corresponds to the any one cosine similarity, in the first feature matrix from the first feature matrix, so as to obtain the second feature matrix.

3. The accent detection method according to claim 1, wherein in a case where the first feature matrix is obtained by concatenating the mean-variance normalized prosodic feature vector and each of the plurality of frequency feature vectors in the mean-variance normalized speech spectrum feature matrix, the performing the redundancy removal operation on the first feature matrix to obtain the second feature matrix comprises:

obtaining a first weight matrix;

processing the first feature matrix by using the first weight matrix to obtain a dimension reduction matrix, wherein a dimension of the dimension reduction matrix is less than that of the first feature matrix;

performing a dimension transformation operation on the dimension reduction matrix to obtain a first intermediate feature matrix, wherein a dimension of the first intermediate feature matrix is the same as that of the first feature matrix;

converting each element in the first intermediate feature matrix into a preset interval, so as to obtain a second intermediate feature matrix; and setting, in response to that any element in the second intermediate feature matrix is less than a second preset value, the any element in the second intermediate feature matrix to zero, so as to obtain the second feature matrix.

4. The accent detection method according to claim 1, wherein the extracting the prosodic feature of the audio data to obtain the prosodic feature vector comprises:

determining a Gaussian mixed model of word duration corresponding to the word; and extracting a word duration likelihood corresponding to the audio data based on the Gaussian mixed model of word duration corresponding to the word, wherein an element of the prosodic feature vector comprises the word duration likelihood corresponding to the audio data.

5. The accent detection method according to claim 4, wherein the determining the Gaussian mixed model of word duration corresponding to the word comprises:

obtaining a word duration corresponding to the audio data based on the audio data;

calculating a phoneme weighted sum of the word, and determining a category of the word based on the phoneme weighted sum of the word; and determining the Gaussian mixed model of word duration corresponding to the word based on the category of the word; and the extracting the word duration likelihood corresponding to the audio data based on the Gaussian mixed model of word duration corresponding to the word comprises:

calculating a first probability density value corresponding to the audio data through the Gaussian mixed model of word duration corresponding to the word based on the word duration corresponding to the audio data; and obtaining the word duration likelihood corresponding to the audio data based on the first probability density value corresponding to the audio data.

6. The accent detection method according to claim 1, wherein the extracting the prosodic feature of the audio data to obtain the prosodic feature vector comprises:

determining a Gamma mixed model of accent duration corresponding to the word; and extracting an accented syllable duration likelihood corresponding to the audio data based on the Gamma mixed model of accent duration corresponding to the word, wherein an element of the prosodic feature vector comprises the accented syllable duration likelihood corresponding to the audio data.

7. The accent detection method according to claim 6, wherein the determining the Gamma mixed model of accent duration corresponding to the word comprises:

obtaining a word duration corresponding to the audio data and a phoneme duration of a vowel phoneme in an accented syllable of the word based on the audio data, and determining a normalized phoneme duration of the vowel phoneme in the accented syllable of the word based on the word duration corresponding to the audio data and the phoneme duration of the vowel phoneme in the accented syllable of the word that have been obtained; and determining the Gamma mixed model of accent duration corresponding to the word based on the vowel phoneme in the accented syllable of the word; and the extracting the accented syllable duration likelihood corresponding to the audio data based on the Gamma mixed model of accent duration corresponding to the word comprises:
 calculating a second probability density value corresponding to the audio data through the Gamma mixed model of accent duration based on the normalized phoneme duration; and
 obtaining the accented syllable duration likelihood corresponding to the audio data based on the second probability density value corresponding to the audio data.

8. The accent detection method according to claim 1, wherein the extracting the prosodic feature of the audio data to obtain the prosodic feature vector comprises:
 extracting a word duration likelihood corresponding to the audio data based on a Gaussian mixed model of word duration corresponding to the word;
 extracting an accented syllable duration likelihood corresponding to the audio data based on a Gamma mixed model of accent duration corresponding to the word; and
 obtaining a ratio of the accented syllable duration likelihood to the word duration likelihood corresponding to the audio data based on the word duration likelihood corresponding to the audio data and the accented syllable duration likelihood corresponding to the audio data,
 wherein an element of the prosodic feature vector comprises the ratio of the accented syllable duration likelihood to the word duration likelihood corresponding to the audio data.

9. The accent detection method according to claim 1, wherein the extracting the prosodic feature of the audio data to obtain the prosodic feature vector comprises: extracting a slope of word fundamental frequency corresponding to the audio data;
 wherein an element of the prosodic feature vector comprises the slope of word fundamental frequency corresponding to the audio data.

10. The accent detection method according to claim 1, wherein the extracting the prosodic feature of the audio data to obtain the prosodic feature vector comprises:
 determining an audio segment corresponding to an accented syllable in the word based on the audio data; and
 sequentially performing a framing operation, a frequency domain transformation operation and a Bark domain transformation operation on the audio segment corresponding to the accented syllable in the word, and extracting a short-term energy variance of accented syllable corresponding to the audio data within a predetermined Bark domain frequency band,
 wherein an element of the prosodic feature vector comprises the short-term energy variance of accent syllable corresponding to the audio data.

11. The accent detection method according to claim 1, wherein the extracting the prosodic feature of the audio data to obtain the prosodic feature vector comprises:
 performing a syllable segmentation on the audio data according to an accented vowel and an unaccented vowel of the word, so as to obtain an accented audio group comprising an accented audio segment and an unaccented audio group comprising an unaccented audio segment;
 calculating an average fundamental frequency value of the accented audio group and an average fundamental frequency value of the unaccented audio group; and
 obtaining an average fundamental frequency ratio of the accented audio group to the unaccented audio group corresponding to the audio data based on the average fundamental frequency value of the accented audio group and the average fundamental frequency value of the unaccented audio group,
 wherein an element of the prosodic feature vector comprises the average fundamental frequency ratio of the accented audio group to the unaccented audio group corresponding to the audio data.

12. The accent detection method according to claim 1, wherein the extracting the prosodic feature of the audio data to obtain the prosodic feature vector comprises:
 performing a syllable segmentation on the audio data according to an accented vowel and an unaccented vowel of the word, so as to obtain an accented audio group comprising an accented audio segment and an unaccented audio group comprising an unaccented audio segment;
 calculating an average energy value of the accented audio group and an average energy value of the unaccented audio group; and
 obtaining an average energy ratio of the accented audio group to the unaccented audio group corresponding to the audio data based on the average energy value of the accented audio group and the average energy value of the unaccented audio group,
 wherein an element of the prosodic feature vector comprises the average energy ratio of the accented audio group to the unaccented audio group corresponding to the audio data.

13. The accent detection method according to claim 1, wherein the extracting the prosodic feature of the audio data to obtain the prosodic feature vector comprises:
 determining an audio segment corresponding to an accented syllable in the word based on the audio data;
 sequentially performing a framing operation, a frequency domain transformation operation and a Bark domain transformation operation on the audio segment corresponding to the accented syllable in the word, and performing a time domain transformation operation on signals within a predetermined frequency band of Bark domain to obtain an intermediate waveform; and
 performing empirical mode decomposition on the intermediate waveform to obtain at least one mode component corresponding to the audio data,
 wherein an element of the prosodic feature vector comprises the at least one mode component corresponding to the audio data.

14. The accent detection method according to claim 1, wherein the extracting the prosodic feature of the audio data to obtain the prosodic feature vector comprises: extracting at least one selected from a group consisting of a word duration, a word energy, and a word fundamental frequency that correspond to the audio data,
 wherein an element of the prosodic feature vector comprises the at least one selected from the group consisting of the word duration, the word energy, and the word fundamental frequency.

15. The accent detection method according to claim 1, wherein the classifier comprises a convolutional neural network.

16. An accent detection device, comprising:

an obtaining unit, configured to obtain audio data of a word;

a prosodic feature extraction unit, configured to extract a prosodic feature of the audio data to obtain a prosodic feature vector;

a spectrogram matrix extraction unit, configured to determine a pronunciation segment in the audio data corresponding to the word based on the word and the audio data, configured to sequentially perform a framing operation, a frequency domain transformation operation and a Bark domain transformation operation on the pronunciation segment in the audio data to obtain the spectrogram, configured to extract an original speech spectrum feature matrix within a predetermined Bark domain frequency band based on the spectrogram, and configured to perform a dimension transformation operation on the original speech spectrum feature matrix to obtain a speech spectrum feature matrix;

a matrix computing unit, configured to perform a mean-variance normalization processing on the prosodic feature vector to obtain a mean-variance normalized prosodic feature vector, configured to perform a mean-variance normalization processing on the speech spectrum feature matrix to obtain a mean-variance normalized speech spectrum feature matrix which comprises a plurality of frequency feature vectors, configured to perform a concatenate operation on the mean-variance normalized prosodic feature vector and the mean-variance normalized speech spectrum feature matrix to obtain a first feature matrix, and configured to perform a redundancy removal operation on the first feature matrix to obtain a second feature matrix; and a classification unit, configured to classify the second feature matrix to obtain an accent detection result of the audio data;

wherein the matrix computing unit being configured to perform the concatenate operation on the mean-variance normalized prosodic feature vector and the mean-variance normalized speech spectrum feature matrix to obtain the first feature matrix comprises:

the matrix computing unit being configured to perform a dimension transformation operation on the mean-variance normalized prosodic feature vector to obtain a first feature vector, wherein a dimension of the first feature vector is the same as that of any one frequency feature vector in the mean-variance normalized speech spectrum feature matrix, and to concatenate the first feature vector and the mean-variance normalized speech spectrum feature matrix to obtain the first feature matrix, wherein the first feature matrix comprises the first feature vector and all of the plurality of frequency feature vectors in the mean-variance normalized speech spectrum feature matrix; or the matrix computing unit being configured to concatenate the mean-variance normalized prosodic feature vector and each of the plurality of frequency feature vectors in the mean-variance normalized speech spectrum feature matrix, so as to obtain the first feature matrix.

17. An accent detection device, comprising:

a memory, configured to non-transitorily store computer readable instructions; and a processor, configured to execute the computer readable instructions, wherein upon the computer readable instructions being executed by the processor, the accent detection method according to claim 1 is executed.

18. A non-transitory storage medium, storing computer readable instructions non-transitorily, wherein upon the computer readable instructions being executed by a computer, instructions for the accent detection method according to claim 1 are executed.

\* \* \* \* \*